US012596315B2

(12) United States Patent
Katsura et al.

(10) Patent No.: US 12,596,315 B2

(45) Date of Patent: Apr. 7, 2026

(54) TONER

(71) Applicant: CANON KABUSHIKI KAISHA, Tokyo (JP)

(72) Inventors: Taiji Katsura, Shizuoka (JP); Masatake Tanaka, Kanagawa (JP); Dai Nozaki, Shizuoka (JP); Shintaro Kawaguchi, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 439 days.

(21) Appl. No.: 18/173,501

(22) Filed: Feb. 23, 2023

(65) Prior Publication Data

US 2023/0273539 A1 Aug. 31, 2023

(30) Foreign Application Priority Data

Feb. 28, 2022 (JP) ................................ 2022-029176

(51) Int. Cl.
*G03G 9/093* (2006.01)

(52) U.S. Cl.
CPC ..... *G03G 9/09342* (2013.01); *G03G 9/09364* (2013.01)

(58) Field of Classification Search
CPC .......... G03G 9/09342; G03G 9/09364; G03G 9/09725; G03G 9/08
See application file for complete search history.

(56) References Cited

U.S. PATENT DOCUMENTS

| | | | |
|---|---|---|---|
| 7,123,862 | B2 | 10/2006 | Hasegawa |
| 7,141,342 | B2 | 11/2006 | Toyoda |
| 7,264,910 | B2 | 9/2007 | Toyoda |
| 7,537,875 | B2 | 5/2009 | Mikuriya et al. |
| 7,582,401 | B2 | 9/2009 | Ogawa |
| 7,611,812 | B2 | 11/2009 | Michel et al. |
| 7,678,523 | B2 | 3/2010 | Hiroko |
| 7,678,524 | B2 | 3/2010 | Hasegawa |
| 7,833,685 | B2 | 11/2010 | Tanaka |
| 7,833,687 | B2 | 11/2010 | Kato |
| 7,923,190 | B2 | 4/2011 | Magome |
| 7,935,467 | B2 | 5/2011 | Dojo |
| 8,211,606 | B2 | 7/2012 | Murai |
| 8,227,162 | B2 | 7/2012 | Sano |
| 8,377,616 | B2 | 2/2013 | Tani |
| 8,426,091 | B2 | 4/2013 | Magome |
| 8,426,094 | B2 | 4/2013 | Magome |
| 8,518,620 | B2 | 8/2013 | Dojo |
| 8,614,044 | B2 | 12/2013 | Matsui |
| 8,628,899 | B2 | 1/2014 | Kawamura |
| 8,652,722 | B2 | 2/2014 | Yoshida et al. |
| 8,697,327 | B2 | 4/2014 | Shibata |
| 8,778,585 | B2 | 7/2014 | Matsui |
| 8,815,484 | B2 | 8/2014 | Tanaka |
| 8,828,639 | B2 | 9/2014 | Kamikura |
| 8,841,054 | B2 | 9/2014 | Dojo |
| 8,916,319 | B2 | 12/2014 | Ikeda |
| 8,940,467 | B2 | 1/2015 | Hashimoto |
| 9,034,549 | B2 | 5/2015 | Shiotari |
| 9,040,216 | B2 | 5/2015 | Fukudome |
| 9,116,448 | B2 | 8/2015 | Terauchi |
| 9,134,637 | B2 | 9/2015 | Hotta |
| 9,141,012 | B2 | 9/2015 | Moribe |
| 9,146,485 | B2 | 9/2015 | Tani |
| 9,152,065 | B2 | 10/2015 | Sano |
| 9,158,216 | B2 | 10/2015 | Shimano |
| 9,229,345 | B2 | 1/2016 | Ikeda |
| 9,235,151 | B2 | 1/2016 | Tanaka |
| 9,256,148 | B2 | 2/2016 | Fujikawa |
| 9,261,806 | B2 | 2/2016 | Moribe |
| 9,285,697 | B2 | 3/2016 | Fukudome |
| 9,377,705 | B2 | 6/2016 | Shimano |
| 9,377,708 | B2 | 6/2016 | Magome |
| 9,383,668 | B2 | 7/2016 | Noji |
| 9,423,714 | B2 | 8/2016 | Kenmoku |
| 9,470,993 | B2 | 10/2016 | Nishikawa |
| 9,500,972 | B2 | 11/2016 | Tanaka |
| 9,551,947 | B2 | 1/2017 | Hiroko |
| 9,556,290 | B2 | 1/2017 | Nishiura |

(Continued)

FOREIGN PATENT DOCUMENTS

| | | | |
|---|---|---|---|
| CN | 100507727 | C | 7/2009 |
| EP | 3 709 087 | A1 | 9/2020 |

(Continued)

OTHER PUBLICATIONS

Kyowa Chemical Industry DHT-4A technical data sheet (2025).
U.S. Appl. No. 18/046,585, filed Oct. 14, 2022, Yuta Komiya.
U.S. Appl. No. 18/173,247, filed Feb. 23, 2023, Kosuke Fukudome.
U.S. Appl. No. 18/173,255, filed Feb. 23, 2023, Takayuki Toyoda.
U.S. Appl. No. 18/173,278, filed Feb. 23, 2023, Shohei Tsuda.
U.S. Appl. No. 18/173,512, filed Feb. 23, 2023, Masatake Tanaka.
U.S. Appl. No. 18/307,825, filed Apr. 27, 2023, Hiroki Kagawa.
U.S. Appl. No. 18/307,829, filed Apr. 27, 2023, Kazuyuki Sato.
U.S. Appl. No. 18/307,832, filed Apr. 27, 2023, Shohei Shibahara.

*Primary Examiner* — Peter L Vajda
*Assistant Examiner* — Grant Steven Seiler
(74) *Attorney, Agent, or Firm* — VENABLE LLP

(57) ABSTRACT

A toner comprising a toner particle and an external additive, wherein the toner particle comprises a core comprising a resin A and a shell comprising a resin B on the surface of the core, the external additive comprises a hydrotalcite particle A, fluorine and aluminum are present in an inner part of the hydrotalcite particle A in line analysis in STEM-EDS mapping analysis of the toner, and a concentration ratio of the number of fluorine atoms relative to aluminum atoms (F/Al) in the hydrotalcite particle A, as determined by primary component mapping of the hydrotalcite particle A in the STEM-EDS mapping analysis of the toner, is 0.01 to 0.60.

14 Claims, 3 Drawing Sheets

(56) References Cited

U.S. PATENT DOCUMENTS

| | | | |
|---|---|---|---|
| 9,575,424 | B2 | 2/2017 | Nakagawa |
| 9,575,425 | B2 | 2/2017 | Naka |
| 9,588,450 | B2 | 3/2017 | Tsuda |
| 9,594,323 | B2 | 3/2017 | Fujikawa |
| 9,599,919 | B2 | 3/2017 | Isono |
| 9,606,462 | B2 | 3/2017 | Nomura |
| 9,632,441 | B2 | 4/2017 | Abe |
| 9,658,546 | B2 | 5/2017 | Tanaka |
| 9,658,549 | B2 | 5/2017 | Tanaka |
| 9,715,187 | B2 | 7/2017 | Mukumoto |
| 9,715,188 | B2 | 7/2017 | Terauchi |
| 9,720,340 | B2 | 8/2017 | Tominaga |
| 9,772,570 | B2 | 9/2017 | Tsuda |
| 9,778,583 | B2 | 10/2017 | Terauchi |
| 9,785,068 | B2 | 10/2017 | Umeda |
| 9,785,071 | B2 | 10/2017 | Shimano |
| 9,804,514 | B2 | 10/2017 | Suzumura |
| 9,804,519 | B2 | 10/2017 | Suzumura |
| 9,829,814 | B2 | 11/2017 | Yoshida |
| 9,829,816 | B2 | 11/2017 | Tanaka |
| 9,835,964 | B2 | 12/2017 | Yoshida |
| 9,841,692 | B2 | 12/2017 | Hasegawa |
| 9,857,707 | B2 | 1/2018 | Tsuda |
| 9,857,711 | B2 | 1/2018 | Yoshida |
| 9,880,478 | B2 | 1/2018 | Shimano |
| 9,904,193 | B2 | 2/2018 | Nakagawa |
| 9,904,195 | B2 | 2/2018 | Matsui |
| 9,927,728 | B2 | 3/2018 | Arimura |
| 9,946,179 | B2 | 4/2018 | Arimura |
| 9,946,181 | B2 | 4/2018 | Hasegawa |
| 9,952,523 | B2 | 4/2018 | Shimano |
| 9,958,801 | B2 | 5/2018 | Tanaka |
| 9,964,874 | B2 | 5/2018 | Suzumura |
| 9,964,881 | B2 | 5/2018 | Ikejiri |
| 9,971,262 | B2 | 5/2018 | Hasegawa |
| 9,971,263 | B2 | 5/2018 | Fukudome |
| 9,971,264 | B2 | 5/2018 | Sano |
| 10,012,919 | B2 | 7/2018 | Matsui |
| 10,012,923 | B2 | 7/2018 | Sano |
| 10,054,866 | B2 | 8/2018 | Tanaka |
| 10,101,683 | B2 | 10/2018 | Nishikawa |
| 10,114,303 | B2 | 10/2018 | Katsura |
| 10,156,800 | B2 | 12/2018 | Tsuda |
| 10,197,934 | B2 | 2/2019 | Matsui |
| 10,228,627 | B2 | 3/2019 | Nagashima |
| 10,289,016 | B2 | 5/2019 | Fukudome |
| 10,295,921 | B2 | 5/2019 | Ohmori |
| 10,303,074 | B2 | 5/2019 | Yamawaki |
| 10,310,396 | B2 | 6/2019 | Kamikura |
| 10,310,397 | B2 | 6/2019 | Sano |
| 10,338,487 | B2 | 7/2019 | Kamikura |
| 10,345,726 | B2 | 7/2019 | Nakamura |
| 10,353,308 | B2 | 7/2019 | Hatakeyama |
| 10,401,750 | B2 | 9/2019 | Nakamura |
| 10,429,757 | B2 | 10/2019 | Yoshida |
| 10,503,090 | B2 | 12/2019 | Tominaga |
| 10,539,893 | B2 | 1/2020 | Tanaka |
| 10,539,899 | B2 | 1/2020 | Nakamura |
| 10,545,420 | B2 | 1/2020 | Kinumatsu |
| 10,545,422 | B2 | 1/2020 | Yamawaki |
| 10,551,758 | B2 | 2/2020 | Tanaka |
| 10,578,990 | B2 | 3/2020 | Tsuda |
| 10,635,010 | B2 | 4/2020 | Kamikura |
| 10,635,011 | B2 | 4/2020 | Umeda |
| 10,698,327 | B2 | 6/2020 | Nagashima |
| 10,732,530 | B2 | 8/2020 | Matsui |
| 10,782,623 | B2 | 9/2020 | Yoshiba |
| 10,845,721 | B2 | 11/2020 | Tanaka |
| 10,845,722 | B2 | 11/2020 | Nishikawa |
| 10,859,933 | B2 | 12/2020 | Kinumatsu |
| 10,877,387 | B2 | 12/2020 | Fukudome |
| 10,877,388 | B2 | 12/2020 | Aoki |
| 10,877,389 | B2 | 12/2020 | Kamikura |
| 10,895,815 | B2 | 1/2021 | Kamikura |
| 10,942,466 | B2 | 3/2021 | Tominaga |
| 10,976,678 | B2 | 4/2021 | Yamawaki |
| 10,976,679 | B2 | 4/2021 | Tanaka |
| 11,003,103 | B2 | 5/2021 | Kinumatsu |
| 11,003,104 | B2 | 5/2021 | Katsura |
| 11,003,105 | B2 | 5/2021 | Sato |
| 11,092,905 | B2 | 8/2021 | Fukudome |
| 11,099,493 | B2 | 8/2021 | Komiya |
| 11,112,708 | B2 | 9/2021 | Uratani |
| 11,112,710 | B2 | 9/2021 | Nakayama |
| 11,112,712 | B2 | 9/2021 | Matsunaga |
| 11,112,714 | B2 | 9/2021 | Amano |
| 11,169,458 | B2 | 11/2021 | Toyoizumi |
| 11,169,460 | B2 | 11/2021 | Kototani |
| 11,175,600 | B2 | 11/2021 | Uchiyama |
| 11,181,839 | B2 | 11/2021 | Yamashita |
| 11,181,840 | B2 | 11/2021 | Nagata |
| 11,181,844 | B2 | 11/2021 | Nagaoka |
| 11,181,845 | B2 | 11/2021 | Shimoda |
| 11,181,846 | B2 | 11/2021 | Kinumatsu |
| 11,249,408 | B2 | 2/2022 | Tsuda |
| 11,249,412 | B2 | 2/2022 | Kawamura |
| 11,256,187 | B2 | 2/2022 | Ogaki |
| 11,287,758 | B2 | 3/2022 | Matsui |
| 11,314,178 | B2 | 4/2022 | Kenmoku |
| 11,333,989 | B2 | 5/2022 | Unno |
| 11,347,157 | B2 | 5/2022 | Kamikura |
| 11,448,980 | B2 | 9/2022 | Matsui |
| 11,531,282 | B2 | 12/2022 | Kamikura |
| 11,573,519 | B2 | 2/2023 | Fumita |
| 2009/0305159 | A1* | 12/2009 | Zhou et al. .............. G03G 9/08 |
| 2015/0004540 | A1 | 1/2015 | Ozawa |
| 2015/0010652 | A1 | 1/2015 | Kurogi |
| 2018/0120721 | A1 | 5/2018 | Obara et al. |
| 2019/0064686 | A1 | 2/2019 | Terauchi |
| 2020/0285165 | A1 | 9/2020 | Chiba et al. |
| 2020/0292956 | A1* | 9/2020 | Amano et al. ......... G03G 9/097 |
| 2021/0003934 | A1 | 1/2021 | Fumita |
| 2021/0132519 | A1 | 5/2021 | Hashimoto |
| 2021/0223731 | A1 | 7/2021 | Suzuki |
| 2021/0373450 | A1 | 12/2021 | Kawaguchi |
| 2021/0397110 | A1 | 12/2021 | Katsura |
| 2021/0405549 | A1 | 12/2021 | Ookubo |
| 2022/0026822 | A1 | 1/2022 | Sato |
| 2022/0026823 | A1 | 1/2022 | Sano |
| 2022/0121132 | A1 | 4/2022 | Yoshida |
| 2022/0121133 | A1 | 4/2022 | Yamawaki |
| 2022/0128915 | A1 | 4/2022 | Toyoda |
| 2022/0128916 | A1 | 4/2022 | Yoshida |
| 2022/0128919 | A1 | 4/2022 | Kawamura |
| 2022/0146952 | A1 | 5/2022 | Komiya |
| 2022/0146955 | A1 | 5/2022 | Nozaki |
| 2022/0171301 | A1 | 6/2022 | Suzumura |
| 2022/0171302 | A1 | 6/2022 | Sato |
| 2022/0171303 | A1 | 6/2022 | Hiramatsu |
| 2022/0206402 | A1 | 6/2022 | Uratani |
| 2022/0214629 | A1 | 7/2022 | Kenmoku |
| 2022/0214630 | A1 | 7/2022 | Kamikura |
| 2022/0291601 | A1 | 9/2022 | Katsura |
| 2022/0326633 | A1 | 10/2022 | Aoki |
| 2022/0365457 | A1 | 11/2022 | Unno |
| 2022/0373916 | A1 | 11/2022 | Adachi |
| 2022/0390870 | A1 | 12/2022 | Kyuushima |
| 2022/0390871 | A1 | 12/2022 | Isono |
| 2022/0397836 | A1 | 12/2022 | Toyoda |
| 2022/0404730 | A1 | 12/2022 | Nagaoka |
| 2023/0014130 | A1 | 1/2023 | Sano |
| 2023/0015518 | A1 | 1/2023 | Nozaki |
| 2023/0042289 | A1 | 2/2023 | Tanaka |
| 2023/0047510 | A1 | 2/2023 | Tsuda |
| 2023/0047560 | A1 | 2/2023 | Saeki |
| 2023/0080900 | A1 | 3/2023 | Kamikura |
| 2023/0117448 | A1 | 4/2023 | Fukudome |
| 2023/0122974 | A1 | 4/2023 | Kagawa |

FOREIGN PATENT DOCUMENTS

| | | | |
|---|---|---|---|
| JP | 55-28750 | A | 2/1980 |
| JP | 2000-35692 | | 2/2000 |
| JP | 2002-221820 | A | 8/2002 |

(56) References Cited

FOREIGN PATENT DOCUMENTS

| | | | |
|---|---|---|---|
| JP | 2005-272323 | A | 10/2005 |
| JP | 2006-500605 | A | 1/2006 |
| JP | 2007-322953 | A | 12/2007 |
| JP | 2009-42343 | A | 2/2009 |
| JP | 2013-68901 | A | 4/2013 |
| JP | 2014-209197 | A | 11/2014 |
| JP | 2015-11077 | A | 1/2015 |
| JP | 2017-10002 | | 1/2017 |
| JP | 2017-198929 | | 11/2017 |
| JP | 2019-45578 | | 3/2019 |
| JP | 2019-168632 | A | 10/2019 |
| JP | 2020-109511 | A | 7/2020 |
| JP | 2020-148928 | | 9/2020 |
| JP | 2021-9251 | | 1/2021 |
| WO | 2013/147284 | | 10/2013 |
| WO | 2018/181189 | A1 | 10/2018 |

* cited by examiner

TONER

BACKGROUND OF THE INVENTION

Field of the Invention

The present disclosure relates to a toner used in an image-forming method such as an electrophotographic method.

Description of the Related Art

In recent years, there have been demands for electrophotographic image forming apparatuses, such as multifunctional devices and printers, to have longer service lives and consume less power. From the perspective of achieving a long service life in a toner, the toner needs to exhibit durability so that high quality images can be stably obtained when used for a long period of time. In addition, the need for so-called low-temperature fixing toners, with which toner fixing can be implemented using less heat, has increased from the perspective of consuming less power.

To address this problem, Japanese Patent Application Publication No. 2007-322953 discloses a toner which is obtained by aggregating resin particles having a core-shell type structure and in which a difference between a glass transition point of a resin that constitutes the core and a glass transition point of a resin that constitutes the shell is 20° C. or more.

Japanese Patent Application Publication No. 2015-011077 discloses a toner in which the surface of a toner core particle is covered with a shell layer including a resin containing a unit derived from a monomer of a thermosetting resin and a unit derived from a thermoplastic resin.

SUMMARY OF THE INVENTION

However, in cases where a shell layer is formed in order to increase durability, as in the toners disclosed in the documents mentioned above, the durability of the toner is increased, but outmigration of a release agent in the toner tends not to occur at the time of fixing. As a result, low-temperature fixability tends to deteriorate because blistering, cold offsetting, or the like, occurs.

It is known that toners having a core-shell type structure can suppress waxes and low melting point components in the toner from being exposed at the toner surface and exhibit improved durability. In comparison with a toner not having a core-shell type structure, a toner having a core-shell type structure can be expected to be able to implement low temperature fixing while maintaining durability.

However, in a case where outmigration of a wax to the surface of a toner layer at the time of fixing is suppressed through formation of a shell, adhesive strength increases between the toner layer and a fixing member such as a fixing film, and image defects during low temperature fixing, such as cold offsetting and blistering, can occur. In a case where the thickness of a shell is increased in order to improve durability, image defects during low temperature fixing, such as cold offsetting and blistering, tend to occur. In cases where a shell is made thinner or partial gaps are provided in a shell from the perspective of low-temperature fixability, outmigration of waxes and low molecular weight components to the surface of a toner particle tends to occur and an external additive tends to become embedded.

As a result, the charging performance and fluidity of the toner decrease, developing performance may decrease, and contamination of members may occur. A toner having a core-shell type structure helps to achieve a balance between durability and fixing performance, but there is still a trade-off between fixing performance and developing performance during long term use, and it can be said that there are still problems in terms of achieving a high degree of balance between low-temperature fixability and durability.

The present disclosure provides a toner in which low-temperature fixability and durability can be achieved to a high degree.

The present disclosure relates to a toner comprising a toner particle and an external additive, wherein the toner particle comprises a core comprising a resin A and a shell comprising a resin B on the surface of the core, the external additive comprises a hydrotalcite particle A, fluorine and aluminum are present in an inner part of the hydrotalcite particle A in line analysis in STEM-EDS mapping analysis of the toner, and a concentration ratio of the number of fluorine atoms relative to aluminum atoms (F/Al) in the hydrotalcite particle A, as determined by primary component mapping of the hydrotalcite particle A in the STEM-EDS mapping analysis of the toner, is 0.01 to 0.60.

The present disclosure can provide a toner in which low-temperature fixability and durability can be achieved to a high degree.

Further features of the present invention will become apparent from the following description of exemplary embodiments with reference to the attached drawings.

DESCRIPTION OF THE EMBODIMENTS

Figure 1A:
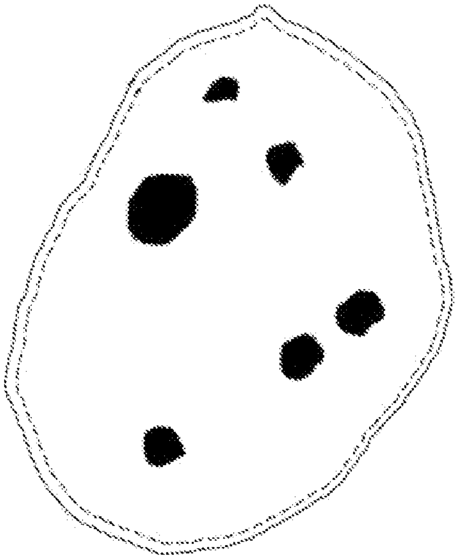
FIGS. 1A and 1B are examples of observed toner cross sections.

In the present disclosure, the terms "from XX to YY" and "XX to YY", which indicate numerical ranges, mean numerical ranges that include the lower limits and upper limits that are the end points of the ranges. In cases where numerical ranges are indicated incrementally, upper limits and lower limits of the numerical ranges can be arbitrarily combined.

In the present disclosure, the term "(meth)acrylic" means "acrylic" and/or "methacrylic".

The inventors of the present invention investigated methods for improving low-temperature fixability while maintaining durability. Specifically, the inventors of the present invention investigated imparting release properties using means other than outmigration of a wax from a core in order to make up for insufficient release properties between a toner layer and a fixing member at the time of fixing. In addition, the inventors of the present invention found that the problems mentioned above could be solved by using the toner described below.

The present disclosure relates to a toner comprising a toner particle and an external additive, wherein the toner particle comprises a core comprising a resin A and a shell comprising a resin B on the surface of the core, the external additive comprises a hydrotalcite particle A, fluorine and aluminum are present in an inner part of the hydrotalcite particle A in line analysis in STEM-EDS mapping analysis of the toner, and a concentration ratio of the number of fluorine atoms relative to aluminum atoms (F/Al) in the hydrotalcite particle A, as determined by primary component mapping of the hydrotalcite particle A in the STEM-EDS mapping analysis of the toner, is 0.01 to 0.60.

The toner contains: a toner particle having a core-shell type structure which has a core containing a resin A and a shell containing a resin B on the surface of the core; and an external additive. The toner contains the hydrotalcite particle A as the external additive.

The matter that the toner particle has a core-shell type structure such as that described above means that the surface of the toner particle is coated with a resin component that is different from a wax component. Moreover, the shell does not necessarily need to coat the whole of the core, and a part of the core may be exposed. Whether or not a core-shell type structure is present can be confirmed through observations of cross sections of the toner using a transmission electron microscope (TEM).

In a case where the toner particle has a core-shell type structure, the amount of wax present close to the surface of the toner is low in a transmission electron microscope (TEM) photograph of the toner cross section. Specifically, in a cross section of the toner observed using a transmission electron microscope (TEM), the ratio by number of toner particles in which domains of the wax having areas of $1.0\times10^{-14}$ $m^2$ or more are even partially present in a region 0.1 μm from the surface of the toner particle is preferably 15% or less, more preferably 10% or less, and further preferably 8% or less.

By externally adding the hydrotalcite particles A to the toner particle having a core-shell type structure, it is possible to significantly improve low-temperature fixability while maintaining developing performance over long term use. Here, the hydrotalcite particles A contain fluorine and aluminum in the inner part of the particles. The mechanism by which it is possible to achieve the effect of improving low-temperature fixability while maintaining developing performance is thought to be as follows.

A case where a toner layered on paper melts to form a toner layer at the time of fixing will now be considered. The toner layer that has melted on the paper comes into contact with a fixing member such as a fixing film, and if release properties between the toner layer and the fixing member are insufficient, the toner layer is pulled towards the fixing member when the fixing member is released from the paper. In this way, adhesive properties between the toner layer and the paper decrease, and fixing defects such as blistering and cold offsetting tend to occur.

Because the toner particle has a shell, when heat or pressure are applied at the time of fixing, the hydrotalcite particles A are unlikely to become embedded in the surface of the toner layer and tend to spread out. That is, the presence of the core-shell type structure can prevent the hydrotalcite particles A from becoming embedded in the surface of the toner layer at the time of fixing.

Because the hydrotalcite particles A contain fluorine, it is possible to reduce attachment of the hydrotalcite particles. Therefore, the hydrotalcite particles A that have spread across the surface of the toner layer contribute to release properties between the fixing member and the toner layer, thereby improving release properties at the time of low temperature fixing. Because tensile forces on the toner layer towards the fixing member side are reduced by this configuration, adhesive properties between the toner layer and the paper are maintained and low-temperature fixability is improved.

The surface of a toner having a core-shell type structure is suppressed in terms of thermal and mechanical changes, and an external additive present at the particle surface is unlikely to become embedded. This tendency is particularly notable towards the lower limit of the toner fixing temperature, and it is thought that this is the reason why release properties at the time of low temperature fixing are improved in the toner of the present disclosure. In addition, storability tends to be improved by the presence of the shell.

In addition, hydrotalcite is a layered compound which undergoes interlayer slippage when the hydrotalcite particles are subjected to pressure at the toner particle surface, thereby increasing the surface area of the hydrotalcite particles. Not only are the hydrotalcite particles A are present without being embedded in the toner particle surface at the time of fixing, but it is thought that an increase in surface area through interlayer slippage contributes significantly to imparting release properties. In addition, fluoride ions are readily introduced (intercalated) between layers in hydrotalcite through anion exchange. Because a fluorine treatment is easy and enables a uniform treatment to be carried out, it is thought that an excellent releasing effect can be exhibited.

Whether or not fluorine and aluminum are present in the hydrotalcite particles can be confirmed through STEM-EDS mapping analysis of the toner. Fluorine and aluminum must be present in the inner part of the hydrotalcite particles A in line analysis in STEM-EDS mapping analysis of the toner.

In addition, the concentration ratio of the number of fluorine atoms relative to aluminum atoms (F/Al element ratio) in the hydrotalcite particles A, as determined by primary component mapping of the hydrotalcite particles A in STEM-EDS mapping analysis of the toner, must be 0.01 to 0.60. If the F/Al ratio is less than 0.01, the effect of imparting release properties by fluorine is low and is not effective. If the F/Al exceeds 0.60, the hydrotalcite particles A readily detach from the toner particle, and toner transferred to a paper is unlikely to remain on the paper. As a result, the effect of imparting release properties is not achieved.

The F/Al element ratio of fluorine relative to aluminum in the hydrotalcite particles A is preferably 0.02 to 0.60, more preferably 0.04 to 0.60, and further preferably 0.04 to 0.30. If this ratio is 0.02 or more, sufficient fluorine is present to impart release properties, and a superior releasing effect can be achieved. If this ratio is 0.60 or less, the hydrotalcite particles tend to remain on the toner particle, and release properties at the time of fixing and toner charging performance are improved.

The F/Al ratio can be controlled by adjusting the concentration of fluorine when the hydrotalcite particles A are produced. The concentration of the number of fluorine atoms in the hydrotalcite particles A is preferably 0.05 to 3.00 atom %, and more preferably 0.10 to 2.80 atom %. The concentration of the number of aluminum atoms in the hydrotalcite particles A is preferably 1.50 to 10.00 atom %, more preferably 2.0 to 8.0 atom %, and further preferably 4.00 to 7.00 atom %.

Therefore, it is thought that a favorable releasing effect can be achieved at the time of low temperature fixing as a result of an extremely high synergistic effect between the toner particle having a core-shell type structure and the fluorine-containing hydrotalcite particles A.

The reason why it is important for the external additive used for imparting release properties to be the hydrotalcite particles A is from the perspective of developing performance. In cases where other materials having the effect of imparting release properties, such as fine wax particles, are externally added to the toner, toner charging performance tends to decrease and defects such as fogging tend to occur. It is known that hydrotalcite has the effect of improving the charging performance of the toner, and by using the hydrotalcite particles A, it is possible to obtain a toner that exhibits good fixing performance without causing durability to decrease.

Methods for producing components that constitute the toner and a method for producing the toner will now be explained in greater detail.

The toner particle has a core-shell type structure which has a core containing a resin A and a shell containing a resin B on the surface of the core. Because the toner particle has a core-shell type structure, it is possible to inhibit the hydrotalcite particles A from becoming embedded in the toner particle at the time of fixing, and the releasing effect of the hydrotalcite particles A can be achieved. The matter that the toner particle has a core-shell type structure means that the surface of the toner particle is coated with a resin component that is different from a wax component, as mentioned above.

In addition, it is preferable for the toner particle to contain a wax. In addition, in a cross section of the toner observed using a transmission electron microscope (TEM), the ratio by number of toner particles in which domains of the wax having areas of $1.0\times10^{-14}$ $m^2$ or more are even partially present in a region 0.1 μm from the surface of the toner particle is preferably 15% or less. This value is more preferably 10% or less, and further preferably 8% or less. The lower limit of this value is not particularly limited, but is 0% or more. This ratio by number can be controlled by adjusting the added amount of a resin used as the shell.

In a case where the proportion of toner particles, in which a shell is formed on the toner particle surface and wax domains having at least a certain size are present at the toner particle surface, falls within the range mentioned above, contamination of members at the time of developing is unlikely to occur. As a result, the hydrotalcite particles A tend to be retained at the toner particle surface following development of the toner. In addition, embedding of the hydrotalcite particles A in the toner particle at the time of fixing tends to be suppressed, and a sufficient releasing effect tends to be better exhibited by the hydrotalcite particles A.

The reason for selecting $1.0\times10^{-14}$ $m^2$ or more as the size of the wax domains is from the perspective of the size of the hydrotalcite particles. In a case where the wax domains are sufficiently small in comparison with the size of the hydrotalcite particles, adverse effects such as those mentioned above are unlikely to occur.

Here, a region 0.1 μm from the surface of the toner particle does not necessarily specify the thickness of the shell, and means the thickness required to support the shell from below. The thickness of the shell may be less than or more than 0.1 μm. The thickness of the shell is preferably 0.1 μm or less. The thickness of the shell is more preferably 50 nm or less. The thickness of the shell is preferably 1 nm or more. One example of a method for analyzing the thickness of the shell is given below.

Measurements using time of flight secondary ion mass spectrometry: in a case where a depth profile is measured, the depth at which the ratio of a signal derived from the shell and a signal derived from the core is 1:1 is taken to be the thickness of the shell. The thickness of the shell can be controlled by altering the added amount of raw materials used in the shell that are added when the toner particle is produced.

Binder Resin

The core contains the resin A as a binder resin. For the resin A, the following resins and polymers can be given as examples of polyester resins, vinyl-based resins, and other binder resins. Examples thereof include styrene acrylic resins, polyester resins, epoxy resins, polyurethane resins, polyamide resins, cellulose resins, polyether resins, and mixed resins and complex resins of these.

From the perspectives of being inexpensive and easy to procure and exhibiting excellent low-temperature fixability, the resin A is preferably a polyester resin, a styrene acrylic resin or a hybrid resin of these, and is more preferably a polyester resin or a styrene acrylic resin.

The polyester resin can be obtained by using a conventional well-known method, such as a transesterification method or a polycondensation method, by selecting and combining appropriate materials from among polycarboxylic acids, polyols, hydroxycarboxylic acids, and the like.

A polycarboxylic acid is a compound having 2 or more carboxyl groups per molecule. Of these, a dicarboxylic acid is a compound having 2 carboxyl groups per molecule, and is preferably used.

Examples of dicarboxylic acids include oxalic acid, succinic acid, glutaric acid, maleic acid, adipic acid, β-methyladipic acid, azelaic acid, sebacic acid, nonanedicarboxylic acid, decanedicarboxylic acid, undecanedicarboxylic acid, dodecanedicarboxylic acid, fumaric acid, citraconic acid, diglycolic acid, cyclohexane-3,5-diene-1,2-carboxylic acid, hexahydroterephthalic acid, malonic acid, pimelic acid, suberic acid, phthalic acid, isophthalic acid, terephthalic acid, tetrachlorophthalic acid, chlorophthalic acid, nitrophthalic acid, p-carboxyphenylacetic acid, p-phenylenediacetic acid, m-phenylenediacetic acid, o-phenylenediacetic acid, diphenylacetic acid, diphenyl-p,p'-dicarboxylic acid, naphthalene-1,4-dicarboxylic acid, naphthalene-1,5-dicarboxylic acid, naphthalene-2,6-dicarboxylic acid, anthracenedicarboxylic acid and cyclohexanedicarboxylic acid.

Examples of polycarboxylic acids other than the dicarboxylic acids mentioned above include trimellitic acid, trimesic acid, pyromellitic acid, naphthalenetricarboxylic acid, naphthalenetetracarboxylic acid, pyrenetricarboxylic acid, pyrenetetracarboxylic acid, itaconic acid, glutaconic acid, n-dodecylsuccinic acid, n-dodecenylsuccinic acid, isododecylsuccinic acid, isododecenylsuccinic acid, n-octylsuccinic acid and n-octenylsuccinic acid. It is possible to use one of these polycarboxylic acids in isolation or a combination of two or more types thereof.

A polyol is a compound having 2 or more hydroxyl groups per molecule. Of these, a diol is a compound having 2 hydroxyl groups per molecule, and is preferably used.

Specific examples include ethylene glycol, diethylene glycol, triethylene glycol, 1,2-propylene glycol, 1,3-propylene glycol, 1,4-butane diol, 1,5-pentane diol, 1,6-hexane diol, 1,7-heptane diol, 1,8-octane diol, 1,9-nonane diol, 1,10-decane diol, 1,11-undecane diol, 1,12-dodecane diol, 1,13-tridecane diol, 1,14-tetradecane diol, 1,18-octadecane diol, 1,14-eicosane diol, dipropylene glycol, polyethylene glycol, polypropylene glycol, polytetramethylene ether glycol, 1,4-cyclohexane diol, 1,4-cyclohexane dimethanol, 1,4-butene diol, neopentyl glycol, 1,4-cyclohexane diol, polytetramethylene glycol, hydrogenated bisphenol A, bisphenol A, bisphenol F, bisphenol S, and alkylene oxide (ethylene oxide, propylene oxide, butylene oxide and the like) adducts of these bisphenol compounds.

Of these, alkylene glycols having 2 to 12 carbon atoms and alkylene oxide adducts of bisphenol compounds are preferred, and alkylene oxide adducts of bisphenol compounds and combinations of alkylene oxide adducts of bisphenol compounds and alkylene glycols having 2 to 12 carbon atoms are particularly preferred.

Examples of trihydric or higher polyols include glycerin, trimethylolethane, trimethylolpropane, pentaerythritol, hexamethylolmelamine, hexaethylolmelamine, tetramethylolbenzoguanamine, tetraethylolbenzoguanamine, sorbitol, trisphenol PA, phenol novolac, cresol novolac and alkylene oxide adducts of the trihydric or higher polyphenol compounds listed above. It is possible to use one of these trihydric or higher polyols in isolation or a combination of two or more types thereof. In addition, the polyester resin may be a urea group-containing polyester resin. The polyester resin is preferably one in which a carboxyl group at a terminal or the like is not capped.

Examples of styrene acrylic resins include homopolymers comprising polymerizable monomers listed below, copolymers obtained by combining two or more of these polymerizable monomers, and mixtures of these.

Styrene-based monomers such as styrene, α-methylstyrene, β-methylstyrene, o-methylstyrene, m-methylstyrene, p-methylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene and p-phenylstyrene; (meth)acrylic monomers such as methyl (meth)acrylate, ethyl (meth)acrylate, n-propyl (meth)acrylate, iso-propyl (meth)acrylate, n-butyl (meth)acrylate, iso-butyl (meth)acrylate, tert-butyl (meth)acrylate, n-amyl (meth)acrylate, n-hexyl (meth)acrylate, 2-ethylhexyl (meth)acrylate, n-octyl (meth)acrylate, n-nonyl (meth)acrylate, cyclohexyl (meth)acrylate, benzyl (meth)acrylate, dimethyl phosphate ethyl (meth)acrylate, diethyl phosphate ethyl (meth)acrylate, dibutyl phosphate ethyl (meth)acrylate, 2-benzoyloxyethyl (meth)acrylate, (meth)acrylonitrile, 2-hydroxyethyl (meth)acrylate, (meth) acrylic acid and maleic acid;

Vinyl ether-based monomers such as vinyl methyl ether and vinyl isobutyl ether; and vinyl ketone-based monomers such as vinyl methyl ketone, vinyl ethyl ketone and vinyl isopropenyl ketone;

Polyolefins of ethylene, propylene, butadiene, and the like.

The styrene acrylic resin can be obtained using a polyfunctional polymerizable monomer if necessary. Examples of polyfunctional polymerizable monomers include diethylene glycol di(meth)acrylate, triethylene glycol di(meth)acrylate, tetraethylene glycol di(meth)acrylate, polyethylene glycol di(meth)acrylate, 1,6-hexane diol di(meth)acrylate, neopentyl glycol di(meth)acrylate, tripropylene glycol di(meth)acrylate, polypropylene glycol di(meth)acrylate, 2,2'-bis(4-((meth)acryloxydiethoxy)phenyl)propane, trimethylolpropane tri(meth)acrylate, tetramethylolpropane tetra(meth)acrylate, divinylbenzene, divinylnaphthalene and divinyl ether.

In addition, it is possible to further add well-known chain transfer agents and polymerization inhibitors in order to control the degree of polymerization.

Examples of polymerization initiators used for obtaining the styrene acrylic resin include organic peroxide-based initiators and azo-based polymerization initiators.

Examples of organic peroxide-based initiators include benzoyl peroxide, lauroyl peroxide, di-α-cumyl peroxide, 2,5-dimethyl-2,5-bis(benzoyl peroxy)hexane, bis(4-t-butylcyclohexyl) peroxydicarbonate, 1,1-bis(t-butyl peroxy)cyclododecane, t-butyl peroxymaleic acid, bis(t-butyl peroxy) isophthalate, methyl ethyl ketone peroxide, tert-butyl peroxy-2-ethylhexanoate, diisopropyl peroxycarbonate, cumene hydroperoxide, 2,4-dichlorobenzoyl peroxide and tert-butyl-peroxypivalate.

Examples of azo type initiators include 2,2'-azobis(2,4-dimethylvaleronitrile), 2,2'-azobisisobutyronitrile, 1,1'-azobis(cyclohexane-1-carbontrile), 2,2'-azobis-4-methoxy-2,4-dimethylvaleronitrile, azobis(methylbutyronitrile) and 2,2'-azobis-(methylisobutyrate).

In addition, a redox type initiator obtained by combining an oxidizing substance with a reducing substance can be used as a polymerization initiator.

Examples of oxidizing substances include inorganic peroxides such as hydrogen peroxide and persulfates (sodium salts, potassium salts and ammonium salts), and oxidizing metal salts such as tetravalent cerium salts.

Examples of reducing substances include reducing metal salts (divalent iron salts, monovalent copper salts and trivalent chromium salts), ammonia, amino compounds such as lower amines (amines having from 1 to 6 carbon atoms, such as methylamine and ethylamine) and hydroxylamine, reducing sulfur compounds such as sodium thiosulfate, sodium hydrosulfite, sodium hydrogen sulfite, sodium sulfite and aldehyde sulfoxylates, lower alcohols (having from 1 to 6 carbon atoms), ascorbic acid and salts thereof, and lower aldehydes (having from 1 to 6 carbon atoms).

The polymerization initiator is selected with reference to 10-hour half-life decomposition temperatures, and can be a single polymerization initiator or a mixture thereof. The added amount of polymerization initiator varies according to the target degree of polymerization, but is generally an amount of from 0.5 parts by mass to 20.0 parts by mass relative to 100.0 parts by mass of polymerizable monomer.

The resin A may contain a crystalline polyester. Examples of the crystalline polyester include condensation polymerization products of aliphatic diols and aliphatic dicarboxylic acids.

The crystalline polyester resin is preferably a condensation polymerization product of an aliphatic diol having from 2 to 12 carbon atoms and an aliphatic dicarboxylic acid having from 2 to 12 carbon atoms as primary components. Examples of aliphatic diols having from 2 to 12 carbon atoms include the compounds listed below. 1,2-ethane diol, 1,3-propane diol, 1,4-butane diol, 1,5-pentane diol, 1,6-hexane diol, 1,7-heptane diol, 1,8-octane diol, 1,9-nonane diol, 1,10-decane diol, 1,11-undecane diol, 1,12-dodecane diol, and the like.

In addition, an aliphatic diol having a double bond can be used. Examples of aliphatic diols having a double bond include the compounds listed below. 2-butene-1,4-diol, 3-hexene-1,6-diol and 4-octene-1,8-diol.

Examples of aliphatic dicarboxylic acids having from 2 to 12 carbon atoms include the compounds listed below. Oxalic acid, malonic acid, succinic acid, glutaric acid, adipic acid, pimelic acid, suberic acid, azelaic acid, sebacic acid, 1,9-nonanedicarboxylic acid, 1,10-decanedicarboxylic acid, 1,11-undecanedicarboxylic acid, 1,12-dodecanedicarboxylic acid, and lower alkyl esters and acid anhydrides of these aliphatic dicarboxylic acids.

Of these, sebacic acid, adipic acid, 1,10-decanedicarboxylic acid, and lower alkyl esters and acid anhydrides of these are preferred. It is possible to use one of these aliphatic polycarboxylic acids in isolation, or a mixture of two or more types thereof.

In addition, an aromatic dicarboxylic acid can be used. Examples of aromatic dicarboxylic acids include the compounds listed below. Terephthalic acid, isophthalic acid, 2,6-naphthalenedicarboxylic acid and 4,4'-biphenyldicarboxylic acid. Of these, terephthalic acid is preferred from perspectives such as ease of procurement and ease of forming a low melting point polymer.

In addition, a dicarboxylic acid having a double bond can be used. A dicarboxylic acid having a double bond can crosslink the entire resin by means of the double bond, and can be advantageously used in order to suppress hot offsetting at the time of fixing.

Examples of such dicarboxylic acids include fumaric acid, maleic acid, 3-hexene dioic acid and 3-octene dioic acid. In addition, lower alkyl esters and acid anhydrides of these can also be used. Of these, fumaric acid and maleic acid are more preferred.

The method for producing the crystalline polyester is not particularly limited, and it is possible to produce the crystalline polyester by means of an ordinary polyester polymerization method in which a dicarboxylic acid component is reacted with a diol component. For example, it is possible to use a direct polycondensation method or a transesterification method, and the crystalline polyester can be produced using either of these methods depending on the type of monomer used.

The content of the crystalline polyester is preferably from 1.0 parts by mass to 30.0 parts by mass, and more preferably from 3.0 parts by mass to 25.0 parts by mass, relative to 100 parts by mass of the binder resin.

The peak temperature of the maximum endothermic peak of the crystalline polyester, as measured using a differential scanning calorimeter (DSC), is preferably from 50.0° C. to 100.0° C., and is more preferably from 60.0° C. to 90.0° C. from the perspective of low-temperature fixability.

The molecular weight of the resin A is such that the peak molecular weight Mp is preferably from 5000 to 100000, and more preferably from 10000 to 40000. The glass transition temperature Tg of the resin A is preferably from 40° C. to 70° C., and more preferably from 40° C. to 60° C. The content of the resin A is preferably 50 mass % or more relative to the entire amount of resin components in the toner particle. In addition, the content of the resin A in the binder resin is preferably from 50 mass % to 100 mass %.

The shell contains the resin B. For the resin B, materials similar to those resin A above can be given as examples of polyester resins, vinyl-based resins, and other binder resins. From the perspectives of being inexpensive and easy to procure and exhibiting excellent low-temperature fixability, the resin B is preferably a polyester resin, a styrene acrylic resin or a hybrid resin of these, and is more preferably a polyester resin or a styrene acrylic resin.

A material that is the same as, or different from, the resin A in terms of type of material can be used as the resin B. For example, it is possible to use styrene acrylic-based resins as the resin A and the resin B, use polyester resins as the resin A and the resin B, or use a styrene acrylic-based resin as the resin A and a polyester resin as the resin B.

It is preferable for the resin A to contain a styrene acrylic resin and for the resin B to contain a styrene acrylic resin. In addition, it is preferable for the resin A to contain a polyester resin and for the resin B to contain a polyester resin. In addition, it is preferable for the resin A to contain a styrene acrylic resin and for the resin B to contain a polyester resin.

The molecular weight of the resin B is such that the Mp value is preferably from 5000 to 100000, and more preferably from 15000 to 80000.

The glass transition temperature Tg of the resin B is preferably 50 to 100° C., more preferably 55 to 80° C., and further preferably 60 to 80° C. From the perspective of suppressing embedding of the hydrotalcite particles A in the toner particle at the time of fixing, it is preferable to select a material having a higher Tg value than the resin A as the resin B.

The content of the resin B is preferably from 1 mass % to 30 mass % relative to the entire amount of resin components in the toner particle.

Crosslinking Agent

To control the molecular weight of the binder resin constituting the toner particle, a crosslinking agent may also be added during polymerization of the polymerizable monomers.

Examples include ethylene glycol dimethacrylate, ethylene glycol diacrylate, diethylene glycol dimethacrylate, diethylene glycol diacrylate, triethylene glycol dimethacrylate, triethylene glycol diacrylate, neopentyl glycol dimethacrylate, neopentyl glycol diacrylate, divinyl benzene, bis (4-acryloxypolyethoxyphenyl) propane, ethylene glycol diacrylate, 1,3-butylene glycol diacrylate, 1,4-butanediol diacrylate, 1,5-pentanediol diacrylate, 1,6-hexanediol diacrylate, neopentyl glycol diacrylate, diethylene glycol diacrylate, triethylene glycol diacrylate, tetraethylene glycol diacrylate, diacrylates of polyethylene glycol #200, #400 and #600, dipropylene glycol diacrylate, polypropylene glycol diacrylate, polyester diacrylate (MANDA, Nippon Kayaku Co., Ltd.), and these with methacrylate substituted for the acrylate.

The added amount of the crosslinking agent is preferably from 0.001 to 15.000 mass parts per 100 mass parts of the polymerizable monomers.

Release Agent

A well-known wax can be used as a release agent in the toner.

Specific examples thereof include petroleum-based waxes and derivatives thereof, such as paraffin waxes, microcrystalline waxes and petrolatum, montan wax and derivatives thereof, hydrocarbon waxes and derivatives thereof obtained using the Fischer Tropsch process, polyolefin waxes and derivatives thereof, such as polyethylene waxes and polypropylene waxes, and natural waxes and derivatives thereof, such as carnauba wax and candelilla wax. Derivatives include oxides, block copolymers formed with vinyl monomers, and graft-modified products.

Further examples include higher aliphatic alcohols; fatty acids, such as stearic acid and palmitic acid, and amides, esters and ketones of these acids; hydrogenated castor oil and derivatives thereof, plant waxes and animal waxes. It is possible to use one of these release agents in isolation, or a combination thereof.

Of these, use of a hydrocarbon wax or an ester wax tends to improve developing performance and fixing performance, and is therefore preferred. That is, the wax preferably includes a hydrocarbon wax and an ester wax. Moreover, antioxidants may be added to these waxes as long as the characteristics of the toner are not adversely affected.

In addition, from the perspectives of phase separation from the binder resin and crystallization temperature, preferred examples include higher fatty acid esters such as behenyl behenate and dibehenyl sebacate. In addition, an ester wax can also be advantageously used as the plasticizer described later.

The content of the release agent is preferably from 1.0 parts by mass to 30.0 parts by mass relative to 100.0 parts by mass of the binder resin.

The melting point of the release agent is preferably from 30° C. to 120° C., and more preferably from 60° C. to 100° C. By using a release agent having a melting point of from 30° C. to 120° C., a releasing effect is efficiently achieved and a broader fixing range is ensured.

Plasticizer

A crystalline plasticizer is preferably used in order to improve the sharp melt properties of the toner. The plasticizer is not particularly limited, and well-known plasticizers used in toners, such as those listed below, can be used.

Examples thereof include esters of monohydric alcohols and aliphatic carboxylic acids and esters of monohydric carboxylic acids and aliphatic alcohols, such as behenyl behenate, stearyl stearate and palmityl palmitate; esters of dihydric alcohols and aliphatic carboxylic acids and esters of dihydric carboxylic acids and aliphatic alcohols, such as ethylene glycol distearate, dibehenyl sebacate and hexane diol dibehenate; esters of trihydric alcohols and aliphatic carboxylic acids and esters of trihydric carboxylic acids and aliphatic alcohols, such as glycerin tribehenate; esters of tetrahydric alcohols and aliphatic carboxylic acids and esters of tetrahydric carboxylic acids and aliphatic alcohols, such as pentaerythritol tetrastearate and pentaerythritol tetrapalmitate; esters of hexahydric alcohols and aliphatic carboxylic acids and esters of hexahydric carboxylic acids and aliphatic alcohols, such as dipentaerythritol hexastearate and dipentaerythritol hexapalmitate; esters of polyhydric alcohols and aliphatic carboxylic acids and esters of polycarboxylic acids and aliphatic alcohols, such as polyglycerol behenate; and natural ester waxes such as carnauba wax and rice wax. It is possible to use one of these plasticizers in isolation, or a combination thereof.

Colorant

The toner particle may contain a colorant. A well-known pigment or dye can be used as the colorant. From the perspective of excellent weathering resistance, a pigment is preferred as the colorant.

Examples of cyan colorants include copper phthalocyanine compounds and derivatives thereof, anthraquinone compounds and basic dye lake compounds.

Specific examples thereof include the following. C.I. Pigment Blue 1, 7, 15, 15:1, 15:2, 15:3, 15:4, 60, 62 and 66.

Examples of magenta colorants include condensed azo compounds, diketopyrrolopyrrole compounds, anthraquinone compounds, quinacridone compounds, basic dye lake compounds, naphthol compounds, benzimidazolone compounds, thioindigo compounds and perylene compounds.

Specific examples thereof include the following. C.I. Pigment Red 2, 3, 5, 6, 7, 23, 48:2, 48:3, 48:4, 57:1, 81:1, 122, 144, 146, 150, 166, 169, 177, 184, 185, 202, 206, 220, 221 and 254, and C.I. Pigment Violet 19.

Examples of yellow colorants include condensed azo compounds, isoindolinone compounds, anthraquinone compounds, azo metal complexes, methine compounds and allylamide compounds.

Specific examples thereof include the following. C.I. Pigment Yellow 12, 13, 14, 15, 17, 62, 74, 83, 93, 94, 95, 97, 109, 110, 111, 120, 127, 128, 129, 147, 151, 154, 155, 168, 174, 175, 176, 180, 181, 185, 191 and 194.

Examples of black colorants include carbon black and materials colored black using the yellow colorants, magenta colorants and cyan colorants mentioned above.

It is possible to use one of these colorants in isolation, or a combination thereof, and these can be used in the form of solid solutions.

The content of the colorant is preferably from 1.0 parts by mass to 20.0 parts by mass relative to 100.0 parts by mass of the binder resin.

Charge Control Agent and Charge Control Resin

The toner particle may contain a charge control agent or a charge control resin. A well-known charge control agent can be used, and a charge control agent which has a fast triboelectric charging speed and can stably maintain a certain triboelectric charge quantity is particularly preferred. Furthermore, in a case where a toner particle is produced using a suspension polymerization method, a charge control agent which exhibits low polymerization inhibition properties and which is substantially insoluble in an aqueous medium is particularly preferred.

Examples of charge control agents that impart the toner particle with negative chargeability include monoazo metal compounds, acetylacetone metal compounds, aromatic oxycarboxylic acid, aromatic dicarboxylic acid, oxycarboxylic acid and dicarboxylic acid-based metal compounds, aromatic oxycarboxylic acids, aromatic mono- and poly-carboxylic acids and metal salts, anhydrides and esters thereof, phenol derivatives such as bisphenol, urea derivatives, metal-containing salicylic acid-based compounds, metal-containing naphthoic acid-based compounds, boron compounds, quaternary ammonium salts, calixarenes and charge control resins.

It is possible to use a polymer or copolymer having a sulfonic acid group, a sulfonic acid salt group or a sulfonic acid ester group as the charge control resin. It is particularly preferable for a polymer having a sulfonic acid group, a sulfonic acid salt group or a sulfonic acid ester group to contain a sulfonic acid group-containing acrylamide-based monomer or a sulfonic acid group-containing methacrylamide-based monomer at a copolymerization ratio of 2 mass % or more, and more preferably 5 mass % or more.

The charge control resin preferably has a glass transition temperature (Tg) of from 35° C. to 90° C., a peak molecular weight (Mp) of from 10000 to 30000, and a weight average molecular weight (Mw) of from 25000 to 50000. In a case where this is used, it is possible to impart preferred triboelectric charging characteristics without adversely affecting thermal characteristics required of the toner particle. Furthermore, if the charge control resin contains a sulfonic acid group, dispersibility of the charge control resin per se in the polymerizable monomer composition and dispersibility of the colorant and the like are improved, and tinting strength, transparency and triboelectric charging characteristics can be further improved.

It is possible to add one of these charge control agents or charge control resins in isolation, or a combination of two or more types thereof.

The added amount of the charge control agent or charge control resin is preferably from 0.01 parts by mass to 20.0 parts by mass, and more preferably from 0.5 parts by mass to 10.0 parts by mass, relative to 100.0 parts by mass of the binder resin.

External Additive

The toner contains the hydrotalcite particles A as the external additive.

The hydrotalcite particles can be a substance represented by structural formula (1) below.

$$M^{2+}_{y}M^{3+}_{x}(OH)_2A^{n-}_{(x/n)}\cdot mH_2O \qquad \text{Formula (1):}$$

Here, $0<x\leq 0.5$, $y=1-x$, and $m\geq 0$.

$M^{2+}$ and $M^{3+}$ denote a divalent metal and a trivalent metal, respectively.

$M^{2+}$ is preferably at least one type of divalent metal ion selected from the group consisting of Mg, Zn, Ca, Ba, Ni, Sr, Cu and Fe.

$M^{3+}$ is preferably at least one type of trivalent metal ion selected from the group consisting of Al, B, Ga, Fe, Co and In.

$A^{n-}$ is an anion having a valency of n, examples of which include $CO_3^{2-}$, $OH^-$, $Cl^-$, $I^-$, $F^-$, $Br^-$, $SO_4^{2-}$, $HCO_3^-$, $CH_3COO^-$ and $NO_3^-$, and one of these may be present in isolation, or multiple types thereof may be present.

The hydrotalcite particles A contain at least Al as $M^{3+}$ and contain at least F as $A^{n-}$. In addition, the hydrotalcite particles A preferably contain at least Mg as $M^{2+}$. The hydrotalcite particles A preferably further contain magnesium.

That is, the hydrotalcite particles A contain fluorine and aluminum. In addition, the hydrotalcite particles A preferably contain fluorine, aluminum and magnesium.

Specific examples thereof include $Mg_{8.6}Al_4(OH)_{25.2}F_2CO_3 \cdot mH_2O$ and $Mg_{12}Al_4(OH)_{32}F_2CO_3 \cdot mH_2O$.

The hydrotalcite particles may be a solid solution containing a plurality of different elements. In addition, the hydrotalcite particles may contain a small amount of a monovalent metal.

The concentration ratio of the number of magnesium atoms relative to aluminum atoms (Mg/Al element ratio) in the hydrotalcite particles A, as determined by primary component mapping of the hydrotalcite particles A in STEM-EDS mapping analysis of the toner, is preferably 1.5 to 4.0, and more preferably 1.6 to 3.8.

The Mg/Al ratio can be controlled by adjusting amounts of raw materials when hydrotalcite is produced. The concentration of the number of magnesium atoms is preferably 3.00 to 20.00 atom %, more preferably 4.00 to 16.00 atom %, and further preferably 9.00 to 14.00 atom %.

In addition, the hydrotalcite particles A preferably contain water in the molecule, and it is preferable for $0.1<m<0.6$ in formula (1).

The number average particle diameter of primary particles of the hydrotalcite particles A is preferably 60 to 1000 nm, more preferably 60 to 800 nm, and further preferably 200 to 600 nm.

If this number average diameter is 1000 nm or less, the fluidity of the toner tends to be improved and charging performance during long term use is improved.

The hydrotalcite particles may hydrophobically treated using a surface treatment agent. Higher fatty acids, coupling agents, esters and oils such as silicone oils can be used as surface treatment agents. Of these, higher fatty acids are preferably used, and specific examples of these include stearic acid, oleic acid and lauric acid.

The content of the hydrotalcite particles A is not particularly limited, but is preferably 0.01 to 3.00 parts by mass, and more preferably 0.05 to 0.50 parts by mass, relative to 100 parts by mass of the toner particle. The content of the hydrotalcite particles A can be quantitatively determined by X-Ray fluorescence analysis using a calibration curve prepared from a standard sample.

In addition, the areal ratio of the hydrotalcite particles A relative to the toner particles in an EDS measurement field of view, as measured by STEM-EDS mapping analysis of the toner, is preferably 0.07 to 0.54%, more preferably 0.25 to 0.50%, and further preferably 0.35 to 0.45%. The areal ratio mentioned above represents the abundance ratio of hydrotalcite particles relative to toner particles.

Within the range mentioned above, the effect of the hydrotalcite particles can be readily achieved. This areal ratio can be controlled by altering the amount of the hydrotalcite particles added to the toner particles.

The toner particle preferably has at least one polyvalent metal element selected from the group consisting of aluminum, magnesium, calcium and iron, and more preferably contains aluminum. It is thought that a higher releasing effect can be achieved at the time of fixing because fluorine in the hydrotalcite particles is captured by polyvalent metal elements in the toner particle. The content (concentration of number of atoms) of polyvalent metal elements in the toner particle is preferably 0.01 to 0.09, and more preferably 0.01 to 0.06, if the number of carbon atoms in the toner particle is taken to be 100. The content of polyvalent metal elements in the toner particle can be measured from primary component mapping of the toner particle using the STEM-EDS mapping analysis described later.

The toner particle more preferably contains aluminum as a polyvalent metal element. In addition, in primary component mapping of the toner particle in STEM-EDS mapping analysis of the toner, the content of aluminum in the toner particle is preferably 0.01 to 0.07 if the concentration of the number of carbon atoms in the toner particle is taken to be 100. This content is more preferably 0.02 to 0.05. Within the range mentioned above, superior fixing performance and durability can be achieved.

In addition, in primary component mapping of the toner particle and primary component mapping of the hydrotalcite particles A in STEM-EDS mapping analysis of the toner, the ratio of the content of fluorine in the hydrotalcite particles A relative to the content of polyvalent metal elements in the toner particle (fluorine/polyvalent metal elements) is preferably 2.0 to 100.0, more preferably 3.0 to 95.0, and further preferably 4.0 to 60.0. If this ratio falls within the range mentioned above, superior release properties are achieved at the time of fixing. It is thought that a high releasing effect can be achieved at the time of fixing because fluorine in the hydrotalcite particles A is efficiently captured by polyvalent metal elements in the toner particle.

The polyvalent metal elements are preferably present by being dispersed at the toner particle surface and in the inner part of the toner particle. Because the polyvalent metal elements are present in the inner part of the toner particle, charge imparted to the toner particle surface can accumulate in the inner part of the toner particle. Due to this configuration, toner charging characteristics are unlikely to fluctuate, detachment of the hydrotalcite particles A from the toner particle is suppressed, and a releasing effect can be stably achieved.

The means for incorporating the polyvalent metal elements in the inner part of the toner particle is not particularly limited. For example, in a case where the toner particle is produced using a pulverization method, it is possible to incorporate the polyvalent metal elements in a raw material resin in advance or add the polyvalent metal elements when the raw materials are melt kneaded so as to incorporate the polyvalent metal elements in the toner particle. In a case where the toner particle is produced using a wet production method such as a suspension polymerization method or an emulsion aggregation method, it is possible to incorporate the polyvalent metal elements in raw materials or add the polyvalent metal elements via an aqueous medium during the production process.

In an emulsion aggregation method, a metal ion is added as a flocculant in some cases. In this case, the metal ion in the aqueous medium can be incorporated in the toner particle in an ionized state, and this is preferable from the perspective of homogenization. Furthermore, a carboxyl group is present in a molecular chain that constitutes the binder resin in some cases in a toner produced using an emulsion aggregation method. It is possible to form an excellent electrically conductive path to a resin fine particle as a result of the metal ion added as a flocculant coordinating to the carboxyl group. In this case, trivalent aluminum coordinates to carboxyl groups at a smaller amount than divalent magnesium and calcium and iron, which can have multiple valencies, and tends to achieve superior charging characteristics.

The resin A preferably has carboxyl groups. The means for incorporating carboxyl groups in the resin A is not particularly limited. In a case where the resin A is a styrene acrylic resin, a carboxyl group-containing monomer such as (meth)acrylic acid should be used.

Toner Production Method

The method for producing the toner particle is not particularly limited, and can be a well-known method, and it is possible to use a kneading pulverization method or a wet production method. A wet production method is preferred from the perspectives of particle diameter uniformity and shape control properties and readily obtaining a toner particle which has a core-shell structure. Examples of wet production methods include suspension polymerization methods, dissolution suspension methods, emulsion polymerization and aggregation methods, and emulsion aggregation methods, with emulsion aggregation methods being more preferred from the perspective of causing polyvalent metal elements to be dispersed at the toner particle surface and in the inner part of the toner particle.

In an emulsion aggregation method, dispersed solutions of materials such as fine particles of the binder resin and the colorant are first prepared. If necessary, dispersion stabilizers are added to the obtained dispersed solutions of these materials, and dispersed and mixed. Next, a flocculant is added so as to aggregate the dispersed solutions to a desired toner particle diameter, and resin fine particles are fused to each other during or after the aggregation. Toner particles are then formed by carrying out shape control using heat if necessary.

Here, fine particles of the binder resin can form composite particles formed from a plurality of layers comprising two or more layers of resins having different compositions. For example, the toner particle can be produced using an emulsion polymerization method, a mini-emulsion polymerization method, a phase inversion emulsification method, or the like, or by combining several of these methods. In a case where the toner particle contains an internal additive, the internal additive may be contained in resin fine particles, or is possible to separately prepare an internal additive fine particle-dispersed solution comprising only the internal additive and then carry out aggregation when the internal additive fine particles are aggregated with the resin fine particles. In addition, it is possible to carry out aggregation by adding resin fine particles having different compositions at different times during aggregation, thereby producing a toner particle having a configuration in which layers have different compositions. It is possible to aggregate resin fine particles containing the resin A so as to form a core part and then carry out aggregation by adding resin fine particles containing the resin B for shell-forming at different times so as to form a shell part.

Specifically, the toner production method has a shell formation step which is carried out after forming aggregated particles containing the resin A (core particles) in the aggregation step and which comprises further adding resin fine particles containing the shell-forming resin B so as to cause aggregation and form a shell. The shell-forming resin B may be a resin having the same composition as the core-forming resin A, or a resin having a different composition. The added amount of the shell-forming resin is preferably 1.0 to 10.0 parts by mass, and more preferably 2.0 to 7.0 parts by mass, relative to 100 parts by mass of the binder resin contained in the core particles.

In this case, the toner production method preferably has the following steps.

(1) a dispersion step for preparing a dispersed solution of binder resin fine particles that contain the binder resin such as the resin A, (2) an aggregation step for aggregating binder resin fine particles contained in the dispersed solution of binder resin fine particles so as to form aggregates, (3) a shell formation step for further adding resin fine particles containing a shell-forming resin to the dispersed solution containing the aggregates, causing the resin fine particles to aggregate, and forming aggregates having a shell, and (4) a fusion step for heating and fusing the aggregates In addition, the toner production method preferably has (5) a heat sphering step for further increasing the temperature of the aggregates either during step (4) or after steps (1) to (4).

In addition, the toner production method more preferably has the following steps (6) and (7) after step (5).

(6) A cooling step for cooling the aggregates at a cooling rate of 0.1° C./sec or more (7) Following the cooling step, an annealing step for heating and holding the aggregates at a temperature that is not lower than the crystallization temperature or glass transition temperature of the binder resin Substances listed below can be used as dispersion stabilizers.

Well-known cationic surfactants, anionic surfactants and non-ionic surfactants can be used as surfactants.

Examples of inorganic dispersion stabilizers include tricalcium phosphate, magnesium phosphate, zinc phosphate, aluminum phosphate, calcium carbonate, magnesium carbonate, calcium hydroxide, magnesium hydroxide, aluminum hydroxide, calcium metasilicate, calcium sulfate, barium sulfate, bentonite, silica and alumina. In addition, examples of organic dispersion stabilizers include poly (vinyl alcohol), gelatin, methyl cellulose, methylhydroxypropyl cellulose, ethyl cellulose, sodium carboxymethyl cellulose and starch.

In addition to surfactants having the opposite polarity from surfactants used in the dispersion stabilizers mentioned above, inorganic salts and divalent or higher inorganic metal salts can be advantageously used as flocculants. Inorganic metal salts are particularly preferred from the perspectives of facilitating control of aggregation properties and toner charging performance due to polyvalent metal elements being ionized in aqueous media.

Specific examples of preferred inorganic metal salts include metal salts such as calcium chloride, calcium nitrate, barium chloride, magnesium chloride, zinc chloride, iron chloride, aluminum chloride and aluminum sulfate; and inorganic metal salt polymers such as iron polychloride, aluminum polychloride, aluminum polyhydroxide and calcium polysulfide. Of these, aluminum salts and polymers thereof are particularly preferred. In order to attain a sharper particle size distribution, it is generally preferable for the valency of an inorganic metal salt to be divalent rather than monovalent and trivalent or higher rather than divalent, and an inorganic metal salt polymer is more suitable for a given valency.

From the perspectives of high image precision and resolution, the volume-based median diameter of the toner particles is preferably from 3.0 μm to 10.0 μm.

Toner Production Method

The toner contains the hydrotalcite particles A as the external additive. If necessary, other external additives may be added. In this case, the content of the external additive such as inorganic and organic fine particles including the hydrotalcite particles, and the like, is preferably a total of 0.50 to 5.00 parts by mass relative to 100 parts by mass of the toner particle.

The mixing machine used for externally adding the external additive to the toner particle is not particularly limited, and it is possible to use a well-known mixing machine regardless of whether this is a wet mixer or a dry mixer. Examples thereof include an FM mixer (available from Nippon Coke and Engineering Co., Ltd.), a super mixer (available from Kawata Co., Ltd.), a Nobilta (available from Hosokawa Micron Corp.) or a Hybridizer (available from Nara Machinery Co., Ltd.). It is possible to prepare the toner by adjusting the speed of rotation of the external addition apparatus, the treatment time, the jacket water temperature or the amount of water in order to control the state of coverage of the external additive.

In addition, examples of classifying apparatuses able to be used for sieving out coarse particles following the external addition include an Ultrasonic (available from Koei Sangyo Co., Ltd.); a Rezona Sieve or Gyro Sifter (available from Tokuju Co., Ltd.); a Vibrasonic System (available from Dalton); a Soniclean (available from Sinto Kogyo); a Turbo Screener (available from Turbo Kogyo); and a Micron Sifter (available from Makino Mfg. Co., Ltd.).

Explanations will now be given of methods for measuring physical properties of the toner and materials.

Method for Identifying Hydrotalcite Particles

Hydrotalcite particles, which are an external additive, can be identified by combining shape observations obtained using a scanning electron microscope (SEM) with elemental analysis using energy dispersive X-Ray analysis (EDS).

The toner is observed in a field of view magnified a maximum of 50,000 times using a S-4800 scanning electron microscope (produced by Hitachi, Ltd.). The microscope is focused on the toner particle surface, and the external additive to be identified is observed. It is possible to perform EDS analysis on the external additive to be identified and identify hydrotalcite particles from types of element peaks.

For the elemental peaks, if the elemental peak of at least one metal selected from the group consisting of the metals Mg, Zn, Ca, Ba, Ni, Sr, Cu and Fe that may constitute the hydrotalcite particle and the elemental peak of at least one metal selected from the group consisting of Al, B, Ga, Fe, Co and In are observed, the presence of a hydrotalcite particle containing these two metals can be deduced.

A standard sample of the hydrotalcite particle deduced from EDS analysis is prepared separately, and subjected to EDS analysis and SEM shape observation. A particle to be distinguished can be judged to be a hydrotalcite particle based on whether the analysis results for the standard sample match the analysis results for the particle to be distinguished.

Method for Measuring Element Ratios in Hydrotalcite Particles and Element Ratios of Polyvalent Metal Elements in the Toner Particle Element ratios in hydrotalcite particles and element ratios of polyvalent metal elements in the toner particle are measured by means of EDS mapping measurements of the toner using a scanning transmission electron microscope (STEM). In the EDS mapping measurements, each pixel in an analysis area has spectral data. By using a silicon drift detector having a large detection element area, EDS mapping measurements can be carried out with high sensitivity.

By performing statistical analysis on spectral data of pixels obtained using the EDS mapping measurements, it is possible to obtain primary component mapping in which pixels with similar spectra are extracted, and mapping of specific components is possible.

An observation sample is prepared using the following procedure.

A cylindrical toner pellet having a diameter of 8 mm and a thickness of approximately 1 mm is produced by weighing out 0.5 g of a toner and leaving to stand for 2 minutes under a load of 40 kN using a Newton Press in a cylindrical mold having a diameter of 8 mm. A flake having a thickness of 200 nm is produced from the toner pellet using an ultramicrotome (FC7 produced by Leica).

STEM-EDS mapping analysis is carried out using the following apparatus and conditions.

Scanning transmission electron microscope: JEM-2800 produced by JEOL Ltd.

EDS detector: JED-2300T produced by JEOL Ltd.; dry SD100GV detector (detection element area: 100 $mm^2$)

EDS analyzer: NORAN System 7 produced by Thermo Fisher Scientific

STEM-EDS Conditions

STEM accelerating voltage: 200 kV

Magnification ratio: 20,000 times

Probe size: 1 nm

STEM image size: 1024×1024 pixels (EDS elemental mapping images are obtained at the same location)

EDS mapping size: 256×256 pixels, dwell time: 30 μs, number of accumulations: 100 frames Calculations of element ratios in hydrotalcite particles and element ratios of polyvalent metal elements in the toner particle are determined in the following way on the basis of multivariate analysis.

EDS mapping is obtained using the STEM-EDS analysis apparatus mentioned above. Next, acquired spectral mapping data is subjected to multivariate analysis using COMPASS (PCA) mode in the measurement command section of the NORAN System 7 mentioned above, and a primary component mapping image is extracted.

Preset values in this process are as follows.

Kernel size: 3×3

Quantification mapping setting: high (slow)

Filter fit type: high precision (slow)

The areal ratios of the extracted primary components in the EDS measurement field of view are calculated at the same time using this procedure. Obtained EDS spectra in the primary component mapping is subjected to quantitative analysis using the Cliff-Lorimer method.

A toner particle portion and a hydrotalcite particle are differentiated on the basis of the quantitative analysis results of the obtained STEM-EDS primary component mapping. Said particle can be identified as a hydrotalcite particle from the particle size, the particle shape, the content of polyvalent metals such as aluminum and magnesium, and the quantity ratio thereof.

In addition, when fluorine and aluminum are present in the inner part of the hydrotalcite particle by the means described below, the particles can be determined as hydrotalcite particles A.

Method for Analyzing Fluorine and Aluminum in Hydrotalcite Particles

Fluorine and aluminum in the hydrotalcite particles are analyzed on the basis of mapping data derived from STEM-EDS mapping analysis obtained using the method described above. Specifically, fluorine and aluminum present in the inner part of the particle are analyzed by carrying out EDS line analysis in a normal direction relative to the periphery of the hydrotalcite particle.

Figure 2A:
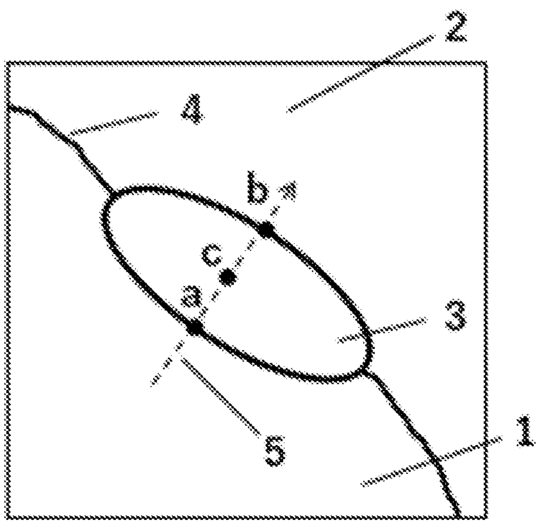
FIGS. 2A to 2C are schematic diagrams of EDS line analysis in STEM-EDS mapping analysis.

FIG. 2A shows a schematic diagram of line analysis. For a hydrotalcite particle 3 adjacent to a toner particle 1 and a toner particle 2, line analysis is carried out in a normal direction relative to the periphery of the hydrotalcite particle 3, that is, in the direction of the arrow on the dotted line 5. Moreover, 4 indicates the boundary between the toner particles.

An area in which a hydrotalcite particle is present in the acquired STEM image is selected using a rectangular selection tool, and line analysis is carried out using the following conditions.

Line Analysis Conditions

STEM magnification ratio: 800,000 times

Line length: 200 nm

Line width: 30 nm

Number of line divisions: 100 (intensity measured every 2 nm)

In a case where the element peak intensity of fluorine or aluminum is at least 1.5 times the background intensity in an EDS spectrum of a hydrotalcite particle, and in a case where the element peak intensity of fluorine or aluminum at both edges of a hydrotalcite particle (points a and b in FIG. 2A) in the line analysis is not more than 3.0 times the peak intensity at point c, it is assessed that the element in question is contained in the inner part of the hydrotalcite particle. Moreover, point c is the midpoint on the line a-b (that is, the midpoint between both edges of the particle).

Figure 2B:
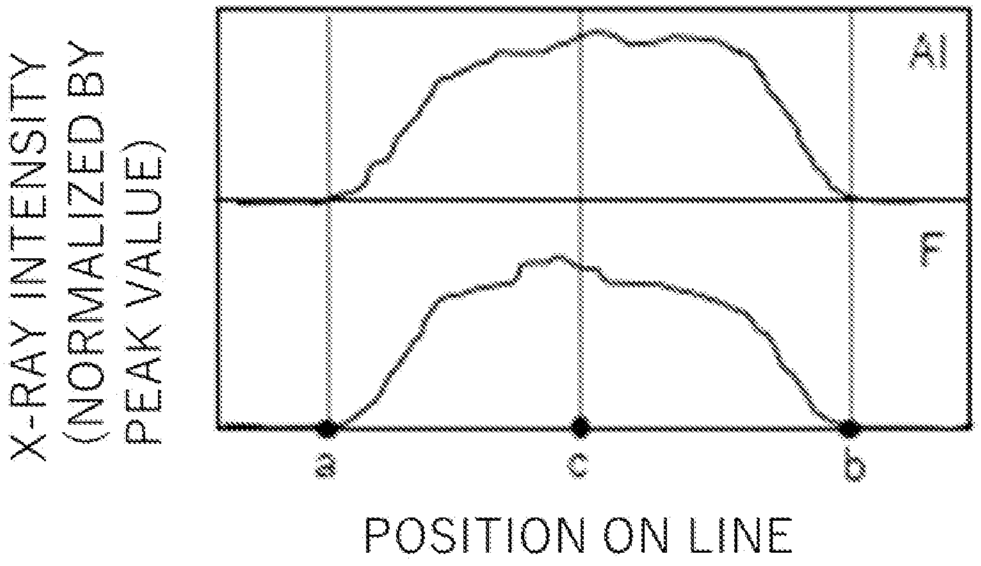
Figure 2C:
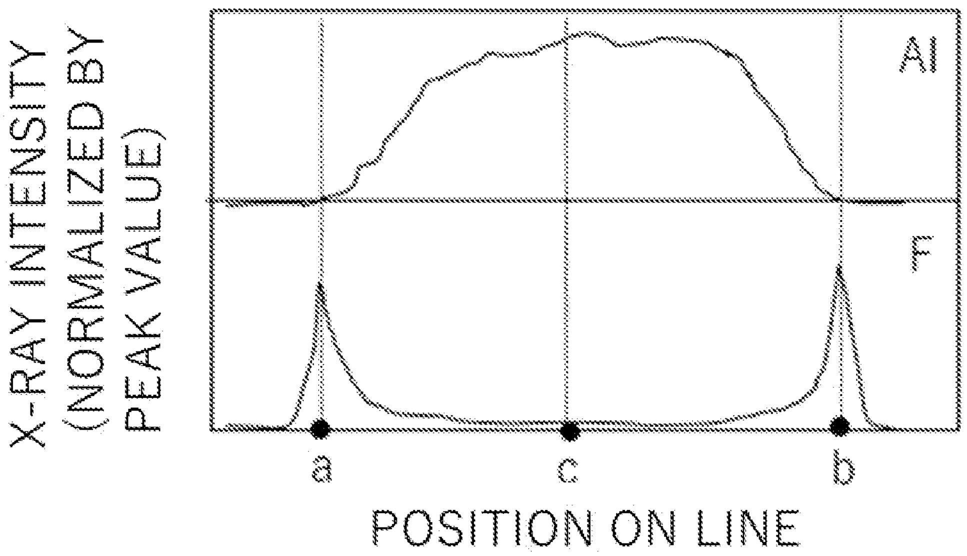

Examples of X-Ray intensities of fluorine and aluminum obtained using line analysis are shown in FIG. 2B and FIG. 2C. In a case where the inner part of a hydrotalcite particle contains fluorine and aluminum, a graph of X-Ray intensity normalized by peak intensity has a shape such as that shown in FIG. 2B. In a case where a hydrotalcite particle contains fluorine derived from a surface treatment agent, a graph of X-Ray intensity normalized by peak intensity has peaks in the vicinity of the edges a and b in the graph for fluorine, as shown in FIG. 2C. By confirming X-Ray intensities derived from fluorine and aluminum in the line analysis, it is possible to confirm that the inner part of the hydrotalcite particle contains fluorine and aluminum.

Method for Calculating Concentration Ratio of Number of Fluorine Atoms Relative to Aluminum Atoms (F/Al Element Ratio) in the Hydrotalcite Particles A The concentration ratio of the number of fluorine atoms relative to aluminum atoms (F/Al) in the hydrotalcite particles A, as determined by primary component mapping derived from hydrotalcite particles A in the STEM-EDS mapping analysis described above, is acquired for multiple fields of view, and by determining the arithmetic mean value for 100 or more of said particles, the concentration ratio of the number of fluorine atoms relative to aluminum atoms (F/Al) in the hydrotalcite particles A is determined.

Method for Calculating Concentration Ratio of Number of Magnesium Atoms Relative to Aluminum Atoms (Mg/Al Element Ratio) in Hydrotalcite Particles a The concentration ratio of the number of magnesium atoms relative to aluminum atoms (Mg/Al element ratio) in hydrotalcite particles A is calculated using a method similar to the method described above for calculating the concentration ratio of the number of fluorine atoms relative to aluminum atoms (F/Al) in hydrotalcite particles A.

Method for Calculating Content of Polyvalent Metal Elements in Toner Particle

The amount of elements (concentration of number of atoms) of polyvalent metal elements and carbon in the toner particle can be obtained from primary component mapping derived from the toner particle in the STEM-EDS mapping analysis described above. The amount (the concentration of number of atoms) of aluminum or the like is taken to be the "content of polyvalent metal elements in the toner particle" if the amount (the concentration of number of atoms) of carbon element is taken to be 100. The mapping data mentioned above is acquired for multiple fields of view, and the "content of polyvalent metal elements in the toner particle" is calculated by determining the arithmetic mean for 100 or more toner particles.

Method for Calculating Ratio of Content of Fluorine in Hydrotalcite Particles A Relative to Content of Polyvalent Metal Elements in Toner Particle From primary component mapping derived from the hydrotalcite particles A in the STEM-EDS mapping analysis described above, amounts of elements are quantitatively determined for Mg, Zn, Ca, Ba, Ni, Sr, Cu, Fe, Al, B, Ga, Co, In, C, O and fluorine, which can be detected using EDS, among elements that can constitute the hydrotalcite particles A. The amount (concentration of number of atoms) of fluorine and other elements is determined.

The determined amount (concentration of number of atoms) of fluorine is taken to be the "content of fluorine in the hydrotalcite particles A". The mapping data mentioned above is acquired for multiple fields of view, and the content of fluorine in the hydrotalcite particles A is calculated by determining the arithmetic mean for 100 or more hydrotalcite particles.

A value in which the "content of fluorine in the hydrotalcite particles A" is taken to be the numerator and the "content of polyvalent metals in the toner particle" is taken to be the denominator is calculated as the "ratio of the content of fluorine in the hydrotalcite particles A relative to the content of polyvalent metal elements in the toner particle".

Method for Calculating Areal Ratio of Hydrotalcite Particles A Relative to Toner Particles The areal ratio of extracted primary components in an EDS measurement field of view can be calculated on the basis of mapping data derived from STEM-EDS mapping analysis of the toner, which is obtained using the method described above. A value in which the "area of hydrotalcite particles" is taken to be the numerator and the "sum total of the area of hydrotalcite particles and the area of toner particles" is taken to be the denominator is calculated as the areal ratio of the hydrotalcite particles A relative to the toner particles.

This mapping data is acquired for multiple fields of view, and the areal ratio of the hydrotalcite particles A relative to the toner particles in an EDS measurement field of view is calculated. The arithmetic mean for 30 fields of view is taken to be the areal ratio of the hydrotalcite particles A relative to the toner particles.

Method for Measuring Number Average Particle Diameter of Primary Particles of Hydrotalcite Particles The number average particle diameter of the hydrotalcite particles is measured by combining elemental analysis obtained from an "S-4800" scanning electron microscope (produced by Hitachi, Ltd.) with energy dispersive X-Ray analysis (EDS). A toner to which the external additive has been externally added is observed, and the hydrotalcite particles are photographed in a field of view at a maximum magnification rate of 200,000 times. Hydrotalcite particles are selected from photographed images, the lengths of primary particles of 100 hydrotalcite particles selected at random are measured, and the number average particle diameter is determined. The magnification ratio is adjusted as appropriate according to the size of the external additive. Here, particles able to be seen as single particles in observations are assessed as being primary particles.

Method for Measuring Glass Transition Temperature (Tg) of Resin

The glass transition temperature of the resin is measured in accordance with ASTM D3418-97.

Specifically, 10 mg of a resin obtained by drying is precisely weighed out and placed in an aluminum pan. An empty aluminum pan is used as a reference. Using a differential scanning calorimeter (DSC6220 produced by SII Technologies), the glass transition temperature of the weighed out resin is measured in accordance with ASTM D 3418-97 at a temperature increase rate of 10° C./min within a measurement temperature range of 0 to 150° C.

Methods for Observing Cross Section of Toner and Evaluating Wax Domains Using Transmission Electron Microscope (TEM)

A cross section of the toner is observed and wax domains are evaluated in the manner described below using a transmission electron microscope (TEM).

A cross section of the toner is stained using ruthenium, and crystalline materials are acquired with clear contrast. The wax, which is a crystalline material, is less strongly stained than non-crystalline materials. This is thought to be because penetration of the staining material into the crystalline materials is weaker than into non-crystalline materials due to differences in density and so on.

Because a difference in the degree of staining means a difference in the amount of ruthenium atoms, a large number of ruthenium atoms are present in strongly stained portions, which become black in an observed image because transmission of an electron beam is difficult. However, the number of ruthenium atoms is low in weakly stained portions, which appear white in an observed image because an electron beam is readily transmitted. In addition, among crystalline materials contained in the toner, high molecular weight crystals such as a crystalline polyester and low molecular weight crystals such as a wax can be distinguished from each other by crystal structure. Specifically, a lamellar structure is seen in an observed image in the case of high molecular weight crystals and a lamellar structure is not seen in an observed image in the case of low molecular weight crystals.

A toner cross section having a thickness of 60 nm is prepared at a cutting speed of 1 mm/sec by applying an osmium film (5 nm) and a naphthalene film (20 nm) as protective films on the toner using an osmium plasma coater (OPC80T produced by filgen), embedding with a photocurable resin (D800 produced by JEOL Ltd.), and then using an ultrasonic wave ultramicrotome (UC7 produced by Leica).

The obtained cross section is stained for 15 minutes in a 500 Pa $RuO_4$ gas atmosphere using a vacuum electron staining apparatus (VSC4R1H produced by filgen), and STEM observations are then carried out using STEM mode with a TEM (JEM2800 produced by JEOL). The STEM probe size is 1 nm, and an image having a size of 1024 pixel×1024 pixel is acquired. The obtained image is binarized using "Image-Pro Plus" image editing software (produced by Media Cybernetics) (threshold 120/255 levels). Crystal domains can be extracted through binarization.

Domains are extracted in which the length of the cross section of a toner particle is within ±10% of the volume-based median diameter of the toner, as determined using measurements described below. Domains having sizes of $1.0\times10^{-14}$ m$^2$ or more are extracted as wax domains in the toner particle. Next, a line is drawn to mark out a region 0.1 μm inwards from the surface of the toner particle (the outline of the cross section), the number of toner particles in which wax domains are even partially present within 0.1 μm from the surface is counted, and the ratio by number of these toner particles relative to the number of observed toner particles is calculated.

Figure 1B:
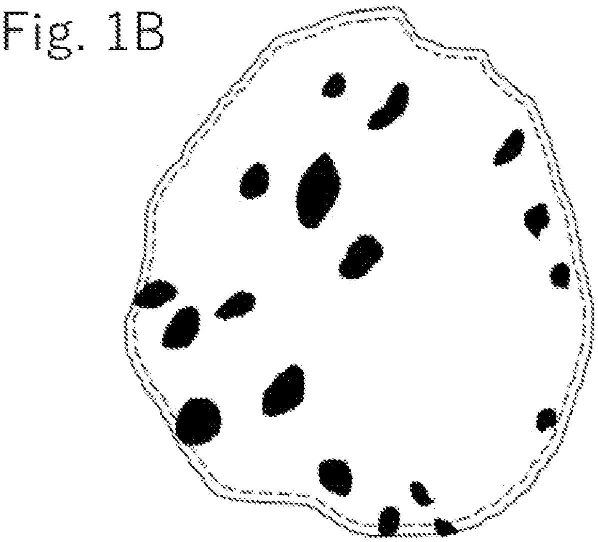

FIGS. 1A and 1B show schematic diagrams of toner particle cross sections. A solid line shows the outline of the cross section, and a dotted line marks out a region 0.1 μm inwards from the outline of the cross section. FIG. 1A shows an example in which wax domains are not present within 0.1 μm of the surface, and FIG. 1B shows an example in which wax domains are present within 0.1 μm of the surface.

Measurements are carried out for at least 100 toner particles extracted at random apart from particle diameter, and the proportion by number of toner particles is calculated.

Identification of Wax in Toner (1) Method for Separating Wax from Toner

First, the melting point of the wax in the toner is measured using a thermal analysis apparatus (DSC Q2000 produced by TA Instruments Japan). 3.0 mg of a toner sample is placed in a sample container that is an aluminum pan (KIT NO. 0219-0041), the sample container is placed in a holder unit, and the holder unit is placed in an electric furnace. A DSC curve is measured using a differential scanning calorimeter (DSC) by heating from 30° C. to 200° C. at a temperature increase rate of 10° C./min in a nitrogen atmosphere, and the melting point of the wax in the toner sample is calculated.

Next, the toner is dispersed in ethanol, which is a poor solvent for the toner, and the temperature is increased to a temperature that is higher than the melting point of the wax. If necessary, pressure may be applied at this point. The wax is melted and extracted into the ethanol as a result of the melting point of the wax being exceeded by this procedure. In a case where heat and pressure are applied, the wax can be separated from the toner by carrying out solid-liquid separation while pressure is being applied. Next, the wax can be obtained by drying/solidifying the extracted liquid.

(2) Identification of Wax by Pyrolysis GCMS

Specific conditions for identifying the wax by means of pyrolysis GCMS are as follows.

Mass spectrometry apparatus: ISQ produced by Thermo Fisher Scientific

GC apparatus: Focus GC produced by Thermo Fisher Scientific

Ion source temperature: 250° C.

Ionization method: EI

Mass range: 50 to 1000 m/z

Column: HP-5MS [30 m]

Pyrolysis apparatus: JPS-700 produced by Japan Analytical Industry Co., Ltd.

A small amount of wax separated using the extraction procedure and 1 μL of tetramethylammonium hydroxide (TMAH) are added to a pyrofoil at 590° C. The prepared sample is subjected to pyrolysis GCMS measurements under the conditions described above, and peaks derived from the wax are obtained. In a case where the wax is an ester compound, peaks derived from an alcohol component and a carboxylic acid component are obtained. The alcohol component and the carboxylic acid components are detected as methylated products through the action of TMAH, which is a methylating agent. The obtained peaks are analyzed, and molecular weights can be determined by identifying the structures of ester compounds.

Compositional Analysis of Binder Resin

Method for Separating Binder Resin from Toner 100 mg of a toner is dissolved in 3 mL of chloroform. Next, insoluble components are removed by subjecting the obtained solution to suction filtration using a syringe equipped with a sample treatment filter (having a pore size of from 0.2 μm to 0.5 μm, for example a Mishoridisk H-25-2 produced by Tosoh Corporation). Soluble components are introduced into a preparative HPLC apparatus (LC-9130 NEXT produced by Japan Analytical Industry Co., Ltd., preparative columns [60 cm], exclusion limits: 20000 and 70000, 2 linked columns), and a chloroform eluant is flushed through the columns. If a peak shown on the obtained chromatograph can be confirmed, a retention time corresponding to a molecular weight of 2000 or more is fractionated with a monodispersed polystyrene standard sample. A binder resin is obtained by drying/solidifying the solution of the obtained fraction.

Identification of Binder Resin Components and Measurement of Mass Ratio by Nuclear Magnetic Resonance (NMR)

1 mL of deuterated chloroform is added to 20 mg of a toner, and a proton NMR spectrum is measured for the dissolved binder resin. Molar ratios and mass ratios of monomers are calculated from the obtained NMR spectrum, and the content values of constituent monomer units in the binder resin, such as a styrene acrylic resin, can be determined. For example, in the case of a styrene-acrylic copolymer, compositional ratios and mass ratios can be calculated from a peak in the vicinity of 6.5 ppm, which is derived from styrene monomer, and a peak derived from an acrylic monomer in the vicinity of 3.5 to 4.0 ppm. In addition, in the case of a copolymer of a polyester resin and a styrene acrylic resin, molar ratios and mass ratios are calculated from peaks derived from monomers that constitute the polyester resin and peaks derived from the styrene-acrylic copolymer.

NMR apparatus: JEOL RESONANCE ECX500

Observation nuclei: protons, measurement mode: single pulse, reference peak: TMS Identification of Components of Shell-Forming Resin B by Time of Flight Secondary Ion Mass Spectrometry (TOF-SIMS)

Because data from a few nanometers from the surface of the toner particle can be obtained in time of flight secondary ion mass spectrometry (TOF-SIMS), it is possible to specify constituent materials close to the outermost surface of the toner particle. A TRIFT-IV produced by Ulvac-Phi is used for identifying the shell-forming resin present at the surface of the toner particle using TOF-SIMS. Analysis conditions are as follows.

Sample preparation: the toner is deposited on an indium sheet.

Sample pretreatment: none

Secondary ions: Au ions

Accelerating voltage: 30 kV

Charge neutralization mode: On

Measurement mode: Negative

Raster: 100 μm

The composition of the resin present at the surface of the toner particle is identified from the peaks, and the abundance ratio of the resin is calculated. S211, for example, is a peak derived from bisphenol A. In addition, S85, for example, is a peak derived from butyl acrylate.

Calculation of intensity of peak derived from vinyl resin (S85): the total count of mass numbers 84.5 to 85.5 in standard software produced by Ulvac-Phi (Win Cadense) is taken to be the peak intensity (S85).

Calculation of intensity of peak derived from amorphous polyester (S211): the total count of mass numbers 210.5 to 211.5 in standard software produced by Ulvac-Phi (Win Cadense) is taken to be the peak intensity (S211).

Method for Measuring Average Circularity of Toner (Particle)

In order to measure the average circularity of the toner or toner particle, measurements are carried out using a "FPIA-3000" flow particle image analyzer (produced by Sysmex Corporation) under calibration operation measurement/analysis conditions.

A dispersed solution for measurements is obtained by adding appropriate amounts of a surfactant and an alkylbenzene sulfonate as dispersing agents to 20 mL of ion exchanged water, then adding 0.02 g of a measurement sample, and then carrying out a dispersion treatment for 2 minutes using a tabletop ultrasonic cleaning disperser having an oscillation frequency of 50 kHz and an electrical output of 150 W (a "VS-150" produced by Velvo-Clear). At this point, the dispersed solution is cooled as appropriate to a temperature of from 10° C. to 40° C.

Measurements are carried out using the flow particle image analyzer fitted with a standard objective lens (10 times magnification), and particle sheath "PSE-900A" (produced by Sysmex Corporation) is used as the sheath liquid. The dispersed solution prepared using the procedure described above is placed in the flow particle image analyzer, 3000 toner (particles) are measured in HPF measurement mode in total count mode, and the average circularity of the toner (particles) is determined by setting the binary threshold value to 85% when analyzing the particles and limiting the diameters of analyzed particles to circle-equivalent diameters of from 1.98 m to 19.92 m.

When carrying out the measurements, automatic focus adjustment is carried out prior to the start of measurements using standard latex particles (for example, particles obtained by diluting 5100A produced by Duke Scientific with ion exchanged water). Thereafter, it is preferable to carry out focus adjustment every 2 hours from the start of measurements.

Measurement of Weight Average Molecular Weight Mw, Number Average Molecular Weight Mn and Peak Molecular Weight The molecular weight distribution (weight average molecular weight Mw, number average molecular weight Mn and peak molecular weight) of a resin or the like is measured by means of gel permeation chromatography (GPC), in the manner described below.

First, a sample is dissolved in tetrahydrofuran (THF) at room temperature over a period of 24 hours. A sample solution is then obtained by filtering the obtained solution using a solvent-resistant membrane filter having a pore diameter of 0.2 μm (a "Mishoridisk" produced by Tosoh Corporation). Moreover, the sample solution is adjusted so that the concentration of THF-soluble components is 0.8 mass %. Measurements are carried out using this sample solution under the following conditions.

Apparatus: HLC8120 GPC (detector: RI) (available from Tosoh Corporation)

Column: Combination of seven Shodex columns (KF-801, 802, 803, 804, 805, 806 and 807 produced by Showa Denko Kabushiki Kaisha)

Eluant: Tetrahydrofuran (THF)

Flow rate: 1.0 mL/min
Oven temperature: 40.0° C.
Injected amount: 0.10 mL

When calculating the molecular weight of the sample, a molecular weight calibration curve is prepared using standard polystyrene resins (for example, the products "TSK Standard Polystyrene F-850, F-450, F-288, F-128, F-80, F-40, F-20, F-10, F-4, F-2, F-1, A-5000, A-2500, A-1000 and A-500", produced by Tosoh Corporation).

Method for Measuring Melting Point

The melting point of crystalline materials (crystalline resins or waxes) is measured under the following conditions using a differential scanning calorimeter (DSC) (Q2000 produced by TA Instruments).

Temperature increase rate: 10° C./min
Measurement start temperature: 20° C.
Measurement end temperature: 180° C.

Temperature calibration of the detector in the apparatus is performed using the melting points of indium and zinc, and heat amount calibration is performed using the heat of fusion of indium.

Specifically, approximately 5 mg of a sample is weighed out, placed in an aluminum pan, and one measurement is carried out. An empty aluminum pan is used as a reference. Here, the peak temperature of the maximum endothermic peak is taken to be the melting point.

Method for Measuring Particle Diameter, Such as Volume-Based Median Diameter, of Toner The particle diameter such as volume-based median diameter of the toner is calculated as follows. A "Multisizer 3 Coulter Counter" precise particle size distribution analyzer (registered trademark, Beckman Coulter, Inc.) based on the pore electrical resistance method and equipped with a 100 μm aperture tube is used as the measurement unit together with the accessory dedicated "Beckman Coulter Multisizer 3 Version 3.51" software (Beckman Coulter, Inc.) for setting the measurement conditions and analyzing the measurement data. Measurement is performed with 25,000 effective measurement channels.

The aqueous electrolytic solution used in measurement may be a solution of special grade sodium chloride dissolved in ion-exchanged water to a concentration of about 1 mass %, such as "ISOTON II" (Beckman Coulter, Inc.) for example.

The following settings are performed on the dedicated software prior to measurement and analysis.

On the "Change standard measurement method (SOMME)" screen of the dedicated software, the total count number in control mode is set to 50000 particles, the number of measurements to 1, and the Kd value to a value obtained with "Standard particles 10.0 μm" (Beckman Coulter, Inc.). The threshold and noise level are set automatically by pushing the "Threshold/noise level measurement" button. The current is set to 1600 μA, the gain to 2, and the electrolytic solution to ISOTON II, and a check is entered for "Aperture tube flush after measurement".

On the "Conversion settings from pulse to particle diameter" screen of the dedicated software, the bin interval is set to the logarithmic particle diameter, the particle diameter bins to 256, and the particle diameter range to 2 to 60 m.

The specific measurement methods are as follows.

(1) About 200 mL of the aqueous electrolytic solution is placed in a glass 250 mL round-bottomed beaker dedicated to the Multisizer 3, the beaker is set on the sample stand, and stirring is performed with a stirrer rod counter-clockwise at a rate of 24 rps. Contamination and bubbles in the aperture tube are then removed by the "Aperture tube flush" function of the dedicated software.
(2) 30 mL of the same aqueous electrolytic solution is placed in a glass 100 mL flat-bottomed beaker, and about 0.3 mL of a dilution of "Contaminon N" (a 10 mass % aqueous solution of a pH 7 neutral detergent for washing precision instruments, comprising a nonionic surfactant, an anionic surfactant, and an organic builder, manufactured by Wako Pure Chemical Industries, Ltd.) diluted about three times by mass with ion-exchange water is added.
(3) An ultrasonic disperser "Ultrasonic Dispersion System Tetra150" (Nikkaki Bios Co., Ltd.) with an electrical output of 120 W equipped with two built-in oscillators having an oscillating frequency of 50 kHz with their phases shifted by 1800 from each other is prepared. About 3.3 L of ion-exchange water is added to the water tank of the ultrasonic disperser, and about 2 mL of Contaminon N is added to the tank.
(4) The beaker of (2) above is set in the beaker-fixing hole of the ultrasonic disperser, and the ultrasonic disperser is operated. The height position of the beaker is adjusted so as to maximize the resonant condition of the liquid surface of the aqueous electrolytic solution in the beaker.
(5) The aqueous electrolytic solution in the beaker of (4) above is exposed to ultrasound as about 10 mg of toner is added bit by bit to the aqueous electrolytic solution, and dispersed. Ultrasound dispersion is then continued for a further 60 seconds. During ultrasound dispersion, the water temperature in the tank is adjusted appropriately to from 10° C. to 40° C.
(6) The aqueous electrolytic solution of (5) above with the toner dispersed therein is dripped with a pipette into the round-bottomed beaker of (1) above set on the sample stand, and adjusted to a measurement concentration of about 5%. Measurement is then performed until the number of measured particles reaches 50000.
(7) The volume-based median diameter is calculated by analyzing measurement data using the accompanying dedicated software.

EXAMPLES

The present invention will now be explained in greater detail by means of the following working examples and comparative examples, but is in no way limited to these examples. Numbers of "parts" used in the working examples mean parts by mass unless explicitly indicated otherwise.

Production examples of the toner will now be explained.

Production Example of Toner 1

Preparation Example of Resin Particle-Dispersed Solution 1

| | |
|---|---|
| Styrene: | 70.0 parts |
| Butyl acrylate: | 28.7 parts |
| Acrylic acid: | 1.3 parts |
| n-laurylmercaptan: | 3.2 parts |

The materials listed above were placed in a container and mixed by being stirred. An aqueous solution of 1.5 parts of Neogen RK (produced by Dai-ichi Kogyo Seiyaku Co., Ltd.) in 150.0 parts of ion exchanged water was added to this solution and dispersed.

While stirring gently for a further 10 minutes, an aqueous solution of 0.3 parts of potassium persulfate in 10.0 parts of ion exchanged water was added. After purging with nitrogen, emulsion polymerization was carried out for 6 hours at 70° C. Following completion of the polymerization, the reaction liquid was cooled to room temperature and ion exchanged water was added, thereby obtaining a resin particle-dispersed solution 1 having a solid content concentration of 12.5 mass % and a glass transition temperature of 48° C. When the particle size distribution of resin particles contained in resin particle-dispersed solution 1 was measured using a particle size measurement apparatus (LA-920 produced by Horiba, Ltd.), the number average particle diameter of contained resin particles was 0.2 μm. In addition, coarse particles having sizes of more than 1 μm were not observed.

Preparation Example of Resin Particle-Dispersed Solution 2

| | |
|---|---|
| Styrene: | 78.0 parts |
| Butyl acrylate: | 20.7 parts |
| Acrylic acid: | 1.3 parts |
| n-laurylmercaptan: | 3.2 parts |

The materials listed above were placed in a container and mixed by being stirred. An aqueous solution of 1.5 parts of Neogen RK (produced by Dai-ichi Kogyo Seiyaku Co., Ltd.) in 150.0 parts of ion exchanged water was added to this solution and dispersed.

While stirring gently for a further 10 minutes, an aqueous solution of 0.3 parts of potassium persulfate in 10.0 parts of ion exchanged water was added. After purging with nitrogen, emulsion polymerization was carried out for 6 hours at 70° C. Following completion of the polymerization, the reaction liquid was cooled to room temperature and ion exchanged water was added, thereby obtaining a resin particle-dispersed solution 2 having a solid content concentration of 12.5 mass % and a glass transition temperature of 60° C. When the particle size distribution of resin particles contained in resin particle-dispersed solution 2 was measured using a particle size measurement apparatus (LA-920 produced by Horiba, Ltd.), the number average particle diameter of contained resin particles was 0.2 μm. In addition, coarse particles having sizes of more than 1 μm were not observed.

Preparation Example of Release Agent-Dispersed Solution 1

Release agent-dispersed solution 1 was obtained by mixing 100.0 parts of behenyl behenate (melting point: 72.1° C.) and 15.0 parts of Neogen RK with 385.0 parts of ion exchanged water and dispersing for approximately 1 hour using a wet jet mill (JN100 produced by Jokoh Co., Ltd.). The wax concentration in release agent-dispersed solution 1 was 20.0 mass %.

When the particle size distribution of release agent particles contained in release agent-dispersed solution 1 was measured using a particle size measurement apparatus (LA-920 produced by Horiba, Ltd.), the number average particle diameter of contained release agent particles was 0.35 μm. In addition, coarse particles having sizes of more than 1 μm were not observed.

Preparation Example of Release Agent-Dispersed Solution 2

Release agent-dispersed solution 2 was obtained by mixing 100.0 parts of a hydrocarbon wax (HNP-9 produced by Nippon Seiro Co., Ltd., melting point: 75.5° C.) and 15 parts of Neogen RK with 385.0 parts of ion exchanged water and dispersing for approximately 1 hour using a wet jet mill (JN100 produced by Jokoh Co., Ltd.). The wax concentration in release agent-dispersed solution 2 was 20.0 mass %.

When the particle size distribution of release agent particles contained in release agent-dispersed solution 2 was measured using a particle size measurement apparatus (LA-920 produced by Horiba, Ltd.), the number average particle diameter of contained release agent particles was 0.35 μm. In addition, coarse particles having sizes of more than 1 μm were not observed.

Preparation Example of Colorant-Dispersed Solution 1

Colorant-dispersed solution 1 was obtained by mixing 50.0 parts of copper phthalocyanine (Pigment Blue 15:3) as a colorant and 5.0 parts of Neogen RK with 200.0 parts of ion exchanged water and dispersing for approximately 1 hour using a JN100 wet jet mill. The solid content concentration in colorant-dispersed solution 1 was 20.0 mass %.

When the particle size distribution of colorant particles contained in colorant-dispersed solution 1 was measured using a particle size measurement apparatus (LA-920 produced by Horiba, Ltd.), the number average particle diameter of contained colorant particles was 0.20 μm. In addition, coarse particles having sizes of more than 1 μm were not observed.

Preparation of Toner Particle 1

| | |
|---|---|
| Resin particle-dispersed solution 1: | 265.0 parts |
| Release agent-dispersed solution 1: | 10.0 parts |
| Release agent-dispersed solution 2: | 8.0 parts |
| Colorant-dispersed solution: | 8.0 parts |

As a core formation step, the materials listed above were placed in a round stainless steel flask and mixed. Next, the obtained mixed solution was dispersed for 10 minutes at 5000 rpm using a homogenizer (an Ultratarax T50 produced by IKA). While stirring, the temperature inside the vessel was adjusted to 30° C., and a 1 mol/L aqueous solution of sodium hydroxide was added to adjust the pH to 8.0.

As a flocculant, an aqueous solution obtained by dissolving 0.25 parts of aluminum chloride in 10.0 parts of ion exchanged water was added over a period of 10 minutes at 30° C. while stirring. After leaving the obtained mixture to stand for 3 minutes, a temperature increase was initiated, the temperature was increased to 60° C., and aggregated particles were produced (core formation). The volume-based median diameter of the formed aggregated particles was conveniently confirmed using a "Coulter Counter Multisizer 3" (registered trademark, produced by Beckman Coulter, Inc.). At the point where the volume-based median diameter was 7.0 μm, a shell was formed by introducing 15.0 parts of resin particle-dispersed solution 2 and stirring for 1 hour as a shell formation step.

Next, a 1 mol/L aqueous solution of sodium hydroxide was added to adjust the pH to 9.0, the temperature was increased to 95° C., and the aggregated particles were spheroidized. When an average circularity of 0.980 was achieved, a temperature decrease was initiated, and the obtained mixture was cooled to room temperature, thereby obtaining toner particle-dispersed solution 1.

Hydrochloric acid was added to the obtained toner particle-dispersed solution 1 to adjust the pH to 1.5 or less, the solution was left to stand for 1 hour, and solid-liquid separation was then carried out using a pressure filter to obtain a toner cake. A slurry was formed from this toner cake using ion exchanged water so as to again form a dispersed solution, and solid-liquid separation was carried out using the filter mentioned above. The re-slurrying and solid-liquid separation were repeated until the electrical conductivity of the filtrate reached 5.0 μS/cm or less, and a final solid-liquid separation was carried out to obtain a toner cake. Toner particle 1 was obtained by drying the obtained toner cake and then classified using a classifier so that the volume-based median diameter was 7.0 μm.

Formulations and physical properties of the obtained toner particles are shown in Tables 1 and 2.

TABLE 1

| | Resin particle (core) | | | | Resin particle (shell) | | | | | |
|---|---|---|---|---|---|---|---|---|---|---|
| Toner particle No. | Resin particle-dispersed solution No. | Type | Tg ° C. | Number of added parts (parts by mass) | Resin particle-dispersed solution No. | Type | Tg ° C. | Number of added parts (parts by mass) | Number of parts of shell | Toner number ratio (%) |
| 1 | 1 | St/BA | 48 | 265 | 2 | St/BA | 60 | 15 | 5.7 | 0 |
| 2 | 1 | St/BA | 48 | 265 | 2 | St/BA | 60 | 15 | 5.7 | 0 |
| 3 | 1 | St/BA | 48 | 265 | 2 | St/BA | 60 | 15 | 5.7 | 0 |
| 4 | 1 | St/BA | 48 | 265 | 2 | St/BA | 60 | 15 | 5.7 | 0 |
| 5 | 1 | St/BA | 48 | 265 | 2 | St/BA | 60 | 15 | 5.7 | 0 |
| 6 | 1 | St/BA | 48 | 265 | 2 | St/BA | 60 | 15 | 5.7 | 0 |
| 7 | 1 | St/BA | 48 | 265 | 2 | St/BA | 60 | 15 | 5.7 | 0 |
| 8 | 1 | St/BA | 48 | 265 | 2 | St/BA | 60 | 15 | 5.7 | 0 |
| 9 | 1 | St/BA | 48 | 265 | 2 | St/BA | 60 | 15 | 5.7 | 0 |
| 10 | 1 | St/BA | 48 | 265 | 2 | St/BA | 60 | 5.2 | 2.0 | 8 |
| 11 | 1 | St/BA | 48 | 265 | 2 | St/BA | 60 | 26.5 | 10.0 | 0 |
| 12 | 1 | St/BA | 48 | 265 | 2 | St/BA | 60 | 18.6 | 7.0 | 0 |
| 13 | 1 | St/BA | 48 | 265 | 2 | St/BA | 60 | 2.6 | 1.0 | 15 |
| 14 | 3 | St/BA | 40 | 265 | 4 | St/BA | 80 | 15 | 5.7 | 0 |
| 15 | 1 | St/BA | 48 | 265 | 5 | St/BA | 73 | 15 | 5.7 | 0 |
| 16 | 6 | St/BA | 58 | 265 | 2 | St/BA | 60 | 15 | 5.7 | 0 |
| 17 | 7 | St/BA | 5 | 265 | 7 | St/BA | 51 | 15 | 5.7 | 0 |
| 18 | 1 | St/BA | 48 | 265 | 2 | St/BA | 60 | 15 | 5.7 | 0 |
| 19 | 1 | St/BA | 48 | 265 | 2 | St/BA | 60 | 15 | 5.7 | 0 |
| 20 | 1 | St/BA | 48 | 265 | 8 | PES | 60 | 15 | 5.7 | 0 |
| 21 | 9 | PES | 52 | 265 | 8 | PES | 60 | 15 | 5.7 | 0 |
| 22 | 1 | St/BA | 48 | 265 | — | — | — | — | 0.0 | 38 |

In the table, "Number of parts of shell" means the number of parts by mass of the shell-forming resin relative to 100 parts by mass of the core particle-forming resin. "Toner number ratio" is the ratio by number of toner particles in which domains of the wax having areas of $1.0\times10^{-14}$ $m^2$ or more are even partially present in a region 0.1 μm from the surface of the toner particle.

TABLE 2

| | Flocculant | |
|---|---|---|
| | Type | Number of added parts (parts by mass) |
| Toner particle 1 | Aluminum chloride | 0.25 |
| Toner particle 2 | Magnesium chloride | 0.22 |
| Toner particle 3 | Calcium chloride | 0.48 |
| Toner particle 4 | Iron (III) chloride | 0.35 |
| Toner particle 5 | Aluminum chloride | 0.30 |
| Toner particle 6 | Aluminum chloride | 0.45 |
| Toner particle 7 | Aluminum chloride | 0.15 |
| Toner particle 8 | Aluminum chloride | 0.58 |
| Toner particle 9 | Aluminum chloride | 0.08 |
| Toner particle 10 | Aluminum chloride | 0.25 |
| Toner particle 11 | Aluminum chloride | 0.25 |
| Toner particle 12 | Aluminum chloride | 0.25 |
| Toner particle 13 | Aluminum chloride | 0.25 |
| Toner particle 14 | Aluminum chloride | 0.25 |
| Toner particle 15 | Aluminum chloride | 0.25 |
| Toner particle 16 | Aluminum chloride | 0.25 |
| Toner particle 17 | Aluminum chloride | 0.25 |
| Toner particle 18 | Aluminum chloride | 0.25 |
| Toner particle 19 | Aluminum chloride | 0.25 |
| Toner particle 20 | Aluminum chloride | 0.25 |
| Toner particle 21 | Aluminum chloride | 0.25 |
| Toner particle 22 | Aluminum chloride | 0.25 |

Production of Hydrotalcite Particles 1

A mixed aqueous solution (solution A) containing 1.03 mol/L of magnesium chloride and 0.239 mol/L of aluminum sulfate, an aqueous solution containing 0.753 mol/L of sodium carbonate (solution B) and an aqueous solution containing 3.39 mol/L of sodium hydroxide (solution C) were prepared.

Next, solution A, solution B and solution C were injected into a reaction tank at a solution A: solution B volume ratio of 4.5:1 using metering pumps, the pH of the reaction liquid was held between the range 9.3 to 9.6 using solution C, and a reaction was carried out at a temperature of 40° C. to produce a precipitate. The precipitate was filtered, washed and re-emulsified with ion exchanged water to obtain a raw material hydrotalcite slurry. The concentration of hydrotalcite in the obtained hydrotalcite slurry was 5.6 mass %.

The obtained hydrotalcite slurry was dried overnight at 40° C. A solution was prepared by dissolving NaF in ion exchanged water at a concentration of 100 mg/L and adjusting the pH to 7.0 using 1 mol/L HCl or 1 mol/L NaOH, and the dried hydrotalcite was added to this solution at a concentration of 0.1% (w/v %). Using a magnetic stirrer, stirring was carried out at a fixed speed for 48 hours so that precipitation did not occur. The solution was then filtered using a membrane filter having a pore diameter of 0.5 μm, and then washed with ion exchanged water. The obtained hydrotalcite was dried overnight at 40° C. and then deagglomerated. The composition and physical properties of the obtained hydrotalcite particles 1 are shown in Table 3.

Production of Hydrotalcite Particles 2 to 13

Hydrotalcite particles 2 to 13 were obtained in the same way as in the production example of hydrotalcite particles 1, except that the concentrations of solution A, solution B and the aqueous solution of NaF were conveniently adjusted. The composition and physical properties of the obtained hydrotalcite particles 2 to 13 are shown in Table 3.

Production of Hydrotalcite Particles 14

Hydrotalcite particles 14 were obtained in the same way as in the production example of hydrotalcite particles 1, except that ion exchanged water was used instead of an aqueous solution of NaF. The composition and physical properties of the obtained hydrotalcite particles 14 are shown in Table 3.

Production of Hydrotalcite Particles 15

Hydrotalcite particles 15 were obtained in the same way as in the production example of hydrotalcite particles 14, except that a fluorosilicone oil was added at an amount of 5 parts by mass relative to 95 parts by mass of solid components and a surface treatment was carried out before the obtained slurry containing a hydrotalcite compound was vacuum dried overnight at 40° C. The composition and physical properties of the obtained hydrotalcite particles 15 are shown in Table 3.

TABLE 3

| | Mg/Al ratio | F/Al ratio | Average particle diameter (nm) | Surface treatment |
|---|---|---|---|---|
| Hydrotalcite particles 1 | 2.2 | 0.12 | 400 | None |
| Hydrotalcite particles 2 | 1.8 | 0.11 | 400 | None |
| Hydrotalcite particles 3 | 3.8 | 0.12 | 400 | None |
| Hydrotalcite particles 4 | 1.6 | 0.12 | 400 | None |
| Hydrotalcite particles 5 | 2.1 | 0.60 | 400 | None |
| Hydrotalcite particles 6 | 2.1 | 0.32 | 400 | None |
| Hydrotalcite particles 7 | 2.1 | 0.02 | 400 | None |
| Hydrotalcite particles 8 | 2.1 | 0.01 | 400 | None |
| Hydrotalcite particles 9 | 2.1 | 0.11 | 800 | None |
| Hydrotalcite particles 10 | 2.1 | 0.11 | 100 | None |
| Hydrotalcite particles 11 | 3.0 | 0.12 | 60 | None |
| Hydrotalcite particles 12 | 2.1 | 0.11 | 1000 | None |
| Hydrotalcite particles 13 | 2.1 | 0.68 | 400 | None |
| Hydrotalcite particles 14 | 2.1 | 0.00 | 400 | None |
| Hydrotalcite particles 15 | 2.1 | 0.00 | 400 | 5 mass % of fluorosilicone oil |

Average particle diameter indicates the number average primary particle diameter.

Production Example of Toner 1

(0.3 parts of) hydrotalcite particles 1 and (1.5 parts of) silica particles 1 (RX200; average primary particle diameter 12 nm; treated with HMDS; produced by Nippon Aerosil Co., Ltd.) were externally added and mixed with (100.0 parts of) the obtained toner particles 1 using a FM10C (produced by Nippon Coke and Engineering Co., Ltd.). External addition conditions were such that the lower blade was an A0 blade, the distance from the deflector wall was 20 mm, the charged amount of toner particles was 2.0 kg, the speed of rotation was 66.6 $s^{-1}$, the external addition time was 10 minutes, the temperature of cooling water was 20° C., and the flow rate of cooling water was 10 L/min.

Toner 1 was obtained by sieving through a mesh having an opening size of 200 μm. Physical properties of obtained toner 1 are shown in Table 4 and Table 5.

Production Examples of Toners 2 to 12

Toners 2 to 12 were obtained in the same way as in the production example of toner 1, except that the type and added amount of hydrotalcite particles were altered as shown in Table 4. Physical properties of obtained toners 2 to 12 are shown in Table 4 and Table 5.

Production Examples of Toners 13 to 20

Production Example of Toner Particle 2 to 9

Toner particles 2 to 9 were obtained in the same way as in the production example of toner particle 1, except that the type and added amount of flocculant were altered as shown in Table 2. Physical properties of obtained toner particles 2 to 9 are shown in Tables 1 and 2. Toners 13 to 20 were obtained in the same way as in the production example of toner 1, except that toner particle 1 was replaced by toner particles 2 to 9. Physical properties of obtained toners 13 to 20 are shown in Table 4 and Table 5.

Production Examples of Toners 21 to 22

Toners 21 to 22 were obtained in the same way as in the production example of toner 1, except that the toner particles and hydrotalcite particles were altered as shown in Table 4. Physical properties of obtained toners 21 to 22 are shown in Table 4 and Table 5.

Production Examples of Toners 23 to 26

Toner particles 10 to 13 were obtained in the same way as in the production example of toner particle 1, except that the added amount of resin particle-dispersed solution 2 was altered as shown in Table 1. Formulations and physical properties of obtained toner particles 10 to 13 are shown in Tables 1 and 2.

Furthermore, toners 23 to 26 were obtained in the same way as in the production example of toner 1, except that toner particle 1 was replaced by toner particles 10 to 13. Physical properties of obtained toners 23 to 26 are shown in Table 4 and Table 5.

Production Examples of Toners 27 to 30

Preparation Example of Resin Particle-Dispersed Solution 3

| | |
|---|---|
| Styrene: | 66.0 parts |
| Butyl acrylate: | 32.7 parts |
| Acrylic acid: | 1.3 parts |
| n-laurylmercaptan: | 3.2 parts |

The materials listed above were placed in a container and mixed by being stirred. An aqueous solution of 1.5 parts of Neogen RK (produced by Dai-ichi Kogyo Seiyaku Co., Ltd.) in 150.0 parts of ion exchanged water was added to this solution and dispersed.

While stirring gently for a further 10 minutes, an aqueous solution of 0.3 parts of potassium persulfate in 10.0 parts of ion exchanged water was added. After purging with nitrogen, emulsion polymerization was carried out for 6 hours at 70° C. Following completion of the polymerization, the reaction liquid was cooled to room temperature and ion exchanged water was added, thereby obtaining a resin particle-dispersed solution 3 having a solid content concentration of 12.5 mass % and a glass transition temperature of 40° C. When the particle size distribution of resin particles contained in resin particle-dispersed solution 3 was measured using a particle size measurement apparatus (LA-920 produced by Horiba, Ltd.), the number average particle diameter of contained resin particles was 0.2 μm. In addition, coarse particles having sizes of more than 1 μm were not observed.

Preparation Example of Resin Particle-Dispersed Solution 4

| | |
|---|---|
| Styrene: | 90.0 parts |
| Butyl acrylate: | 8.7 parts |
| Acrylic acid: | 1.3 parts |
| n-laurylmercaptan: | 3.2 parts |

The materials listed above were placed in a container and mixed by being stirred. An aqueous solution of 1.5 parts of Neogen RK (produced by Dai-ichi Kogyo Seiyaku Co., Ltd.) in 150.0 parts of ion exchanged water was added to this solution and dispersed.

While stirring gently for a further 10 minutes, an aqueous solution of 0.3 parts of potassium persulfate in 10.0 parts of ion exchanged water was added. After purging with nitrogen, emulsion polymerization was carried out for 6 hours at 70° C. Following completion of the polymerization, the reaction liquid was cooled to room temperature and ion exchanged water was added, thereby obtaining a resin particle-dispersed solution 4 having a solid content concentration of 12.5 mass % and a glass transition temperature of 80° C. When the particle size distribution of resin particles contained in resin particle-dispersed solution 4 was measured using a particle size measurement apparatus (LA-920 produced by Horiba, Ltd.), the number average particle diameter of contained resin particles was 0.2 μm. In addition, coarse particles having sizes of more than 1 μm were not observed.

Preparation Example of Resin Particle-Dispersed Solution 5

| | |
|---|---|
| Styrene: | 85.0 parts |
| Butyl acrylate: | 13.7 parts |
| Acrylic acid: | 1.3 parts |
| n-laurylmercaptan: | 3.2 parts |

The materials listed above were placed in a container and mixed by being stirred. An aqueous solution of 1.5 parts of Neogen RK (produced by Dai-ichi Kogyo Seiyaku Co., Ltd.) in 150.0 parts of ion exchanged water was added to this solution and dispersed.

While stirring gently for a further 10 minutes, an aqueous solution of 0.3 parts of potassium persulfate in 10.0 parts of ion exchanged water was added. After purging with nitrogen, emulsion polymerization was carried out for 6 hours at 70° C. Following completion of the polymerization, the reaction liquid was cooled to room temperature and ion exchanged water was added, thereby obtaining a resin particle-dispersed solution 5 having a solid content concentration of 12.5 mass % and a glass transition temperature of 73° C. When the particle size distribution of resin particles contained in resin particle-dispersed solution 5 was measured using a particle size measurement apparatus (LA-920 produced by Horiba, Ltd.), the number average particle diameter of contained resin particles was 0.2 μm. In addition, coarse particles having sizes of more than 1 μm were not observed.

Preparation Example of Resin Particle-Dispersed Solution 6

| | |
|---|---|
| Styrene: | 76.0 parts |
| Butyl acrylate: | 22.7 parts |
| Acrylic acid: | 1.3 parts |
| n-laurylmercaptan: | 3.2 parts |

The materials listed above were placed in a container and mixed by being stirred. An aqueous solution of 1.5 parts of Neogen RK (produced by Dai-ichi Kogyo Seiyaku Co., Ltd.) in 150.0 parts of ion exchanged water was added to this solution and dispersed.

While stirring gently for a further 10 minutes, an aqueous solution of 0.3 parts of potassium persulfate in 10.0 parts of ion exchanged water was added. After purging with nitrogen, emulsion polymerization was carried out for 6 hours at 70° C. Following completion of the polymerization, the reaction liquid was cooled to room temperature and ion exchanged water was added, thereby obtaining a resin particle-dispersed solution 6 having a solid content concentration of 12.5 mass % and a glass transition temperature of 58° C. When the particle size distribution of resin particles contained in resin particle-dispersed solution 6 was measured using a particle size measurement apparatus (LA-920 produced by Horiba, Ltd.), the number average particle diameter of contained resin particles was 0.2 μm. In addition, coarse particles having sizes of more than 1 μm were not observed.

Preparation Example of Resin Particle-Dispersed Solution 7

| | |
|---|---|
| Styrene: | 72.0 parts |
| Butyl acrylate: | 26.7 parts |
| Acrylic acid: | 1.3 parts |
| n-laurylmercaptan: | 3.2 parts |

The materials listed above were placed in a container and mixed by being stirred. An aqueous solution of 1.5 parts of Neogen RK (produced by Dai-ichi Kogyo Seiyaku Co., Ltd.) in 150.0 parts of ion exchanged water was added to this solution and dispersed.

While stirring gently for a further 10 minutes, an aqueous solution of 0.3 parts of potassium persulfate in 10.0 parts of ion exchanged water was added. After purging with nitrogen, emulsion polymerization was carried out for 6 hours at 70° C. Following completion of the polymerization, the reaction liquid was cooled to room temperature and ion exchanged water was added, thereby obtaining a resin particle-dispersed solution 7 having a solid content concentration of 12.5 mass % and a glass transition temperature of 51° C. When the particle size distribution of resin particles contained in resin particle-dispersed solution 7 was measured using a particle size measurement apparatus (LA-920 produced by Horiba, Ltd.), the number average particle diameter of contained resin particles was 0.2 μm. In addition, coarse particles having sizes of more than 1 μm were not observed.

Toner particles 14 to 17 were obtained in the same way as in the production example of toner particle 1, except that the type and added amount of resin particle-dispersed solutions 1 and 2 were altered as shown in Table 1. Formulations and physical properties of obtained toner particles 14 to 17 are shown in Tables 1 and 2. Furthermore, toners 27 to 30 were obtained in the same way as in the production example of toner 1, except that toner particle 1 was replaced by toner particles 14 to 17. Physical properties of obtained toners 27 to 30 are shown in Table 4 and Table 5.

Production Example of Toner 31

Preparation Example of Release Agent-Dispersed Solution 3

Release agent-dispersed solution 3 was obtained by mixing 100.0 parts of pentaerythritol tetrabehenate (melting point: 84.2° C.) and 15 parts of Neogen RK with 385.0 parts of ion exchanged water and dispersing for approximately 1 hour using a wet jet mill (JN100 produced by Jokoh Co., Ltd.). The wax concentration in release agent-dispersed solution 3 was 20.0 mass %.

When the particle size distribution of release agent particles contained in release agent-dispersed solution 3 was measured using a particle size measurement apparatus (LA-920 produced by Horiba, Ltd.), the number average particle diameter of contained release agent particles was 0.35 μm. In addition, coarse particles having sizes of more than 1 μm were not observed.

Preparation Example of Colorant-Dispersed Solution 2

A colorant-dispersed solution was obtained by mixing 100.0 parts of carbon black ("Nipex 35" produced by Orion Engineered Carbons) as a colorant and 15 parts of Neogen RK with 885.0 parts of ion exchanged water and dispersing for approximately 1 hour using a JN100 wet jet mill.

When the particle size distribution of colorant particles contained in colorant particle-dispersed solution 2 was measured using a particle size measurement apparatus (LA-920 produced by Horiba, Ltd.), the number average particle diameter of contained colorant particles was 0.2 μm. In addition, coarse particles having sizes of more than 1 μm were not observed.

Release agent-dispersed solution 3 was used instead of release agent-dispersed solution 1 used in the production example of toner 1. In addition, colorant particle-dispersed solution 2 was used instead of colorant-dispersed solution 1, and the number of added parts was changed from 8 parts to 16 parts. Otherwise, toner particle 18 was obtained in the same way. Furthermore, toner 31 was obtained in the same way as in the production example of toner 1, except that toner particle 1 was replaced by toner particle 18. Physical properties of obtained toner 31 are shown in Table 4 and Table 5.

Production Example of Toner 32

Preparation Example of Release Agent-Dispersed Solution 4

Release agent-dispersed solution 4 was obtained by mixing 100.0 parts of ethylene glycol distearate (melting point: 75.9° C.) and 15 parts of Neogen RK with 385.0 parts of ion exchanged water and dispersing for approximately 1 hour using a wet jet mill (JN100 produced by Jokoh Co., Ltd.). The wax concentration in release agent-dispersed solution 4 was 20.0 mass %.

When the particle size distribution of release agent particles contained in release agent-dispersed solution 4 was measured using a particle size measurement apparatus (LA-920 produced by Horiba, Ltd.), the number average particle diameter of contained release agent particles was 0.35 μm. In addition, coarse particles having sizes of more than 1 μm were not observed.

Release agent-dispersed solution 4 was used instead of release agent-dispersed solution 1 used in the production example of toner 31. Otherwise, toner particle 19 and toner 32 were obtained in the same way. Physical properties of obtained toner 32 are shown in Table 4 and Table 5.

Production Example of Toner 33

Preparation Example of Resin Particle-Dispersed Solution 8

Synthesis of Polyester Resin 1

| | |
|---|---|
| Adduct of 2 moles of ethylene oxide to bisphenol A: | 9 parts by mole |
| Adduct of 2 moles of propylene oxide to bisphenol A: | 95 parts by mole |
| Terephthalic acid: | 50 parts by mole |
| Fumaric acid: | 30 parts by mole |
| Dodecenylsuccinic acid: | 25 parts by mole |

The monomers listed above were charged in a flask equipped with a stirrer, a nitrogen inlet tube, a temperature sensor and a rectifying column, the temperature was increased to 195° C. over a period of 1 hour, and it was confirmed that the contents of the reaction system had been uniformly stirred. Tin distearate was introduced at an amount of 1.0 parts relative to 100 parts of the monomers. The temperature was increased from 195° C. to 250° C. over a period of 5 hours while distilling off water that had been generated, and a dehydrating condensation reaction was carried out for a further 2 hours at 250° C.

Obtained thereby was polyester resin 1, which had a glass transition temperature of 60° C., an acid value of 16.8 mg KOH/g, a hydroxyl value of 28.2 mg KOH/g, a weight average molecular weight of 11200 and a number average molecular weight of 4100.

| | |
|---|---|
| Polyester resin 1: | 100 parts |
| Methyl ethyl ketone: | 50 parts |
| Isopropyl alcohol: | 20 parts |

The methyl ethyl ketone and isopropyl alcohol were placed in a container. A polyester resin 1-dissolved solution was then obtained by gradually adding polyester resin 1 and stirring so as to completely dissolve the resin. The temperature of the container holding this polyester resin 1-dissolved solution was set to 65° C., a total of 5 parts of a 10% aqueous solution of ammonia was gradually added dropwise while stirring, and 230 parts of ion exchanged water was then gradually added dropwise at a rate of 10 mL/min to effect phase inversion emulsification. A resin particle-dispersed solution 8 of polyester resin 1 was then obtained by removing the solvent under reduced pressure using an evaporator.

In addition, the amount of solid content in the resin particle-dispersed solution 8 was adjusted to 20% using ion exchanged water. When the particle size distribution of resin particles contained in resin particle-dispersed solution 8 was measured using a particle size measurement apparatus (LA-920 produced by Horiba, Ltd.), the number average particle diameter of contained resin particles was 0.15 μm. In addition, coarse particles having sizes of more than 1 μm were not observed.

Toner particle 20 and toner 33 were obtained in the same way as in the production example of toner 31, except that resin particle-dispersed solution 2 was replaced by resin particle-dispersed solution 8. Physical properties of obtained toner 33 are shown in Table 4 and Table 5.

Production Example of Toner 34

Preparation Example of Resin Particle-Dispersed Solution 9

Synthesis of Polyester Resin 2

| | |
|---|---|
| Adduct of 2 moles of ethylene oxide to bisphenol A: | 48 parts by mole |
| Adduct of 2 moles of propylene oxide to bisphenol A: | 38 parts by mole |
| Adduct of 3 moles of propylene oxide to bisphenol A: | 10 parts by mole |
| Terephthalic acid: | 65 parts by mole |
| Dodecenylsuccinic acid: | 30 parts by mole |

The monomers listed above were placed in a flask equipped with a stirrer, a nitrogen inlet tube, a temperature sensor and a rectifying column, the temperature was increased to 195° C. over a period of 1 hour, and it was confirmed that the contents of the reaction system had been uniformly stirred. Tin distearate was introduced at an amount of 0.7 parts relative to 100 parts of the monomers. The temperature was increased from 195° C. to 240° C. over a period of 5 hours while distilling off water that had been generated, and a dehydrating condensation reaction was carried out for a further 2 hours at 240° C. The temperature was then lowered to 190° C., 5 parts by mole of trimellitic anhydride was added gradually, and a reaction was allowed to continue for 1 hour at 190° C.

Obtained thereby was polyester resin 2, which had a glass transition temperature of 52° C., an acid value of 13.8 mg KOH/g, a hydroxyl value of 21.2 mg KOH/g, a weight average molecular weight of 43000 and a number average molecular weight of 6400.

| | |
|---|---|
| Polyester resin 2: | 100 parts |
| Methyl ethyl ketone: | 50 parts |
| Isopropyl alcohol: | 20 parts |

The methyl ethyl ketone and isopropyl alcohol were placed in a container. A polyester resin 2-dissolved solution was then obtained by gradually adding polyester resin 2 and stirring so as to completely dissolve the resin. The temperature of the container holding this polyester resin 2-dissolved solution was set to 40° C., a total of 3.5 parts of a 10% aqueous solution of ammonia was gradually added dropwise while stirring, and 230 parts of ion exchanged water was then gradually added dropwise at a rate of 10 mL/min to effect phase inversion emulsification. A resin particle-dispersed solution 9 of polyester resin 2 was then obtained by removing the solvent under reduced pressure.

In addition, the amount of solid content in the resin particle-dispersed solution 9 was adjusted to 20% using ion exchanged water. When the particle size distribution of resin particles contained in resin particle-dispersed solution 9 was measured using a particle size measurement apparatus (LA-920 produced by Horiba, Ltd.), the number average particle diameter of contained resin particles was 0.15 μm. In addition, coarse particles having sizes of more than 1 μm were not observed.

Toner particle 21 and toner 34 were obtained in the same way as in the production example of toner 33, except that resin particle-dispersed solution 1 was replaced by resin particle-dispersed solution 9. Physical properties of obtained toner 34 are shown in Table 4 and Table 5.

Production Example of Toner 35

Toner 35 was obtained in the same way as in the production example of toner 1, except that hydrotalcite particles 1 were replaced by hydrotalcite particles 13. Physical properties of obtained toner 35 are shown in Table 4 and Table 5.

Production Example of Toner 36

Toner 36 was obtained in the same way as in the production example of toner 1, except that hydrotalcite particles 1 were replaced by hydrotalcite particles 14. Moreover, hydrotalcite particles 14 do not contain fluorine. Physical properties of obtained toner 36 are shown in Table 4 and Table 5.

Production Example of Toner 37

Toner 37 was obtained in the same way as in the production example of tone at 1, except that hydrotalcite particles 1 were replaced by polytetrafluoroethylene (PTFE) fine particles ("Fluoro A" produced by Shamrock Technologies;

average primary particle diameter 0.3 μm). Physical properties of obtained toner 37 are shown in Table 4 and Table 5.

Production Example of Toner 38

Toner 38 was obtained in the same way as in the production example of toner 1, except that hydrotalcite particles 1 were replaced by fluorine-containing alumina particles. Physical properties of obtained toner 38 are shown in Table 4 and Table 5.

The fluorine-containing alumina particles were produced by placing alumina having a BET specific surface area of 120 $m^2/g$ in a reaction vessel, spraying a mixed solution comprising 8 parts of heptadecafluorodecyltrimethoxysilane and 1.8 parts of hexamethyldisilazane onto 100 parts of the alumina particles while stirring in a nitrogen atmosphere, heating and stirring for 150 minutes at 220° C., and then cooling.

Production Example of Toner 39

Toner particle 22 was produced in the same way as in the production of toner particle 1, except that the shell formation step was not carried out.

Furthermore, toner 39 was obtained in the same way as in the production example of toner 1, except that toner particle 1 was replaced by toner particle 22. Moreover, toner particle 22 did not have a core-shell type structure because a shell was not formed. Physical properties of obtained toner 39 are shown in Table 4 and Table 5.

Production Example of Toner 40

Toner 40 was obtained in the same way as in the production example of toner 1, except that hydrotalcite particles 1 were replaced by hydrotalcite particles 15. Moreover, hydrotalcite particles 15 were surface treated with a fluorine-containing treatment agent. Physical properties of obtained toner 40 are shown in Table 4 and Table 5.

TABLE 4

| | Toner particle | | Hydrotalcite particles | | | Silica particles 1 | Number of parts of |
|---|---|---|---|---|---|---|---|
| Toner No. | No. | Added amount (parts) | Type | Average particle diameter (nm) | Added amount (parts) | Added amount (parts) | hydrotalcite particles in toner |
| 1 | 1 | 100 | Hydrotalcite particles 1 | 400 | 0.3 | 1.5 | 0.3 |
| 2 | 1 | 100 | Hydrotalcite particles 2 | 400 | 0.3 | 1.5 | 0.3 |
| 3 | 1 | 100 | Hydrotalcite particles 3 | 400 | 0.3 | 1.5 | 0.3 |
| 4 | 1 | 100 | Hydrotalcite particles 4 | 400 | 0.3 | 1.5 | 0.3 |
| 5 | 1 | 100 | Hydrotalcite particles 5 | 400 | 0.3 | 1.5 | 0.3 |
| 6 | 1 | 100 | Hydrotalcite particles 6 | 400 | 0.3 | 1.5 | 0.3 |
| 7 | 1 | 100 | Hydrotalcite particles 7 | 400 | 0.3 | 1.5 | 0.3 |
| 8 | 1 | 100 | Hydrotalcite particles 8 | 400 | 0.3 | 1.5 | 0.3 |
| 9 | 1 | 100 | Hydrotalcite particles 9 | 800 | 0.5 | 1.5 | 0.5 |
| 10 | 1 | 100 | Hydrotalcite particles 10 | 100 | 0.1 | 1.5 | 0.1 |
| 11 | 1 | 100 | Hydrotalcite particles 11 | 60 | 0.05 | 1.5 | 0.05 |
| 12 | 1 | 100 | Hydrotalcite particles 12 | 1000 | 0.5 | 1.5 | 0.5 |
| 13 | 2 | 100 | Hydrotalcite particles 1 | 400 | 0.3 | 1.5 | 0.3 |
| 14 | 3 | 100 | Hydrotalcite particles 1 | 400 | 0.3 | 1.5 | 0.3 |
| 15 | 4 | 100 | Hydrotalcite particles 1 | 400 | 0.3 | 1.5 | 0.3 |
| 16 | 5 | 100 | Hydrotalcite particles 1 | 400 | 0.3 | 1.5 | 0.3 |
| 17 | 6 | 100 | Hydrotalcite particles 1 | 400 | 0.3 | 1.5 | 0.3 |
| 18 | 7 | 100 | Hydrotalcite particles 1 | 400 | 0.3 | 1.5 | 0.3 |
| 19 | 8 | 100 | Hydrotalcite particles 1 | 400 | 0.3 | 1.5 | 0.3 |
| 20 | 9 | 100 | Hydrotalcite particles 1 | 400 | 0.3 | 1.5 | 0.3 |
| 21 | 7 | 100 | Hydrotalcite particles 6 | 400 | 0.3 | 1.5 | 0.3 |
| 22 | 8 | 100 | Hydrotalcite particles 7 | 400 | 0.3 | 1.5 | 0.3 |
| 23 | 10 | 100 | Hydrotalcite particles 1 | 400 | 0.3 | 1.5 | 0.3 |
| 24 | 11 | 100 | Hydrotalcite particles 1 | 400 | 0.3 | 1.5 | 0.3 |
| 25 | 12 | 100 | Hydrotalcite particles 1 | 400 | 0.3 | 1.5 | 0.3 |
| 26 | 13 | 100 | Hydrotalcite particles 1 | 400 | 0.3 | 1.5 | 0.3 |
| 27 | 14 | 100 | Hydrotalcite particles 1 | 400 | 0.3 | 1.5 | 0.3 |
| 28 | 15 | 100 | Hydrotalcite particles 1 | 400 | 0.3 | 1.5 | 0.3 |
| 29 | 16 | 100 | Hydrotalcite particles 1 | 400 | 0.3 | 1.5 | 0.3 |
| 30 | 17 | 100 | Hydrotalcite particles 1 | 400 | 0.3 | 1.5 | 0.3 |
| 31 | 18 | 100 | Hydrotalcite particles 1 | 400 | 0.3 | 1.5 | 0.3 |
| 32 | 19 | 100 | Hydrotalcite particles 1 | 400 | 0.3 | 1.5 | 0.3 |
| 33 | 20 | 100 | Hydrotalcite particles 1 | 400 | 0.3 | 1.5 | 0.3 |
| 34 | 21 | 100 | Hydrotalcite particles 1 | 400 | 0.3 | 1.5 | 0.3 |
| 35 | 1 | 100 | Hydrotalcite particles 13 | 400 | 0.3 | 1.5 | 0.3 |
| 36 | 1 | 100 | Hydrotalcite particles 14 | 400 | 0.3 | 1.5 | 0.3 |
| 37 | 1 | 100 | PTFE particles | 300 | 0.3 | 1.5 | 0 |
| 38 | 1 | 100 | Fluorine-containing alumina particles | 12 | 0.3 | 1.5 | 0 |
| 39 | 22 | 100 | Hydrotalcite particles 1 | 400 | 0.3 | 1.5 | 0.3 |
| 40 | 1 | 100 | Hydrotalcite particles 15 | 400 | 0.3 | 1.5 | 0.3 |

Average particle diameter indicates the number average primary particle diameter. "Number of parts of hydrotalcite particles in toner" indicates the number of parts by mass relative to 100 parts by mass of toner particles.

TABLE 5

| | Toner particle | | Hydrotalcite particles A | | | | | | | | Fluorine/ |
|---|---|---|---|---|---|---|---|---|---|---|
| Toner No. | Polyvalent metal element | Metal Content | Mg atom % | Al atom % | F atom % | Mg/Al | F/Al | ※ | Areal ratio | polyvalent metal |
| 1 | Aluminum | 0.03 | 11.40 | 5.27 | 0.61 | 2.2 | 0.12 | Yes | 0.40 | 20.3 |
| 2 | Aluminum | 0.03 | 10.47 | 5.90 | 0.62 | 1.8 | 0.11 | Yes | 0.42 | 20.7 |
| 3 | Aluminum | 0.03 | 13.20 | 3.43 | 0.35 | 3.8 | 0.12 | Yes | 0.40 | 11.7 |
| 4 | Aluminum | 0.03 | 9.98 | 6.35 | 0.63 | 1.6 | 0.12 | Yes | 0.40 | 21.0 |
| 5 | Aluminum | 0.03 | 9.64 | 4.63 | 2.76 | 2.1 | 0.60 | Yes | 0.42 | 92.0 |
| 6 | Aluminum | 0.03 | 10.35 | 5.04 | 1.62 | 2.1 | 0.32 | Yes | 0.42 | 54.0 |
| 7 | Aluminum | 0.03 | 11.28 | 5.49 | 0.10 | 2.1 | 0.02 | Yes | 0.41 | 3.3 |
| 8 | Aluminum | 0.03 | 11.35 | 5.53 | 0.05 | 2.1 | 0.01 | Yes | 0.42 | 1.7 |
| 9 | Aluminum | 0.03 | 11.04 | 5.37 | 0.57 | 2.1 | 0.11 | Yes | 0.54 | 19.0 |
| 10 | Aluminum | 0.03 | 10.89 | 5.28 | 0.56 | 2.1 | 0.11 | Yes | 0.13 | 18.7 |
| 11 | Aluminum | 0.03 | 12.45 | 4.20 | 0.49 | 3.0 | 0.12 | Yes | 0.07 | 16.3 |
| 12 | Aluminum | 0.03 | 11.04 | 5.37 | 0.57 | 2.1 | 0.11 | Yes | 0.55 | 19.0 |
| 13 | Magnesium | 0.06 | 11.40 | 5.27 | 0.61 | 2.2 | 0.12 | Yes | 0.40 | 11.1 |
| 14 | Calcium | 0.05 | 11.40 | 5.27 | 0.61 | 2.2 | 0.12 | Yes | 0.42 | 11.9 |
| 15 | Iron | 0.09 | 11.40 | 5.27 | 0.61 | 2.2 | 0.12 | Yes | 0.41 | 6.8 |
| 16 | Aluminum | 0.04 | 11.40 | 5.27 | 0.61 | 2.2 | 0.12 | Yes | 0.42 | 15.7 |
| 17 | Aluminum | 0.06 | 11.40 | 5.27 | 0.61 | 2.2 | 0.12 | Yes | 0.42 | 10.2 |
| 18 | Aluminum | 0.01 | 11.40 | 5.27 | 0.61 | 2.2 | 0.12 | Yes | 0.41 | 44.4 |
| 19 | Aluminum | 0.07 | 11.40 | 5.27 | 0.61 | 2.2 | 0.12 | Yes | 0.41 | 8.4 |
| 20 | Aluminum | 0.01 | 11.40 | 5.27 | 0.61 | 2.2 | 0.12 | Yes | 0.42 | 61.0 |
| 21 | Aluminum | 0.01 | 10.35 | 5.04 | 1.62 | 2.1 | 0.32 | Yes | 0.42 | 117.8 |
| 22 | Aluminum | 0.07 | 11.28 | 5.49 | 0.10 | 2.1 | 0.02 | Yes | 0.42 | 1.4 |
| 23 | Aluminum | 0.03 | 11.40 | 5.27 | 0.61 | 2.2 | 0.12 | Yes | 0.42 | 20.3 |
| 24 | Aluminum | 0.03 | 11.40 | 5.27 | 0.61 | 2.2 | 0.12 | Yes | 0.41 | 20.3 |
| 25 | Aluminum | 0.03 | 11.40 | 5.27 | 0.61 | 2.2 | 0.12 | Yes | 0.41 | 20.3 |
| 26 | Aluminum | 0.03 | 11.40 | 5.27 | 0.61 | 2.2 | 0.12 | Yes | 0.42 | 20.3 |
| 27 | Aluminum | 0.03 | 11.40 | 5.27 | 0.61 | 2.2 | 0.12 | Yes | 0.42 | 20.3 |
| 28 | Aluminum | 0.03 | 11.40 | 5.27 | 0.61 | 2.2 | 0.12 | Yes | 0.41 | 20.3 |
| 29 | Aluminum | 0.03 | 11.40 | 5.27 | 0.61 | 2.2 | 0.12 | Yes | 0.41 | 20.3 |
| 30 | Aluminum | 0.03 | 11.40 | 5.27 | 0.61 | 2.2 | 0.12 | Yes | 0.42 | 20.3 |
| 31 | Aluminum | 0.03 | 11.40 | 5.27 | 0.61 | 2.2 | 0.12 | Yes | 0.40 | 20.3 |
| 32 | Aluminum | 0.03 | 11.40 | 5.27 | 0.61 | 2.2 | 0.12 | Yes | 0.42 | 20.3 |
| 33 | Aluminum | 0.03 | 11.40 | 5.27 | 0.61 | 2.2 | 0.12 | Yes | 0.39 | 20.3 |
| 34 | Aluminum | 0.03 | 11.40 | 5.27 | 0.61 | 2.2 | 0.12 | Yes | 0.42 | 20.3 |
| 35 | Aluminum | 0.03 | 9.23 | 4.49 | 3.06 | 2.1 | 0.68 | Yes | 0.40 | 102.0 |
| 36 | Aluminum | 0.03 | 11.42 | 5.56 | 0.00 | 2.1 | 0.00 | No | 0.42 | 0.0 |
| 37 | Aluminum | 0.03 | — | — | — | — | — | — | 0 | — |
| 38 | Aluminum | 0.03 | — | — | — | — | — | — | 0 | — |
| 39 | Aluminum | 0.03 | 11.40 | 5.27 | 0.61 | 2.2 | 0.12 | Yes | 0.42 | 20.3 |
| 40 | Aluminum | 0.03 | 11.05 | 5.22 | 0.01 | 2.1 | 0.00 | No | 0.40 | 0.3 |

In the table, "Metal Content" indicates Content of polyvalent metal element (ratio of element relative to 100 of carbon), atom % means the concentration of the number of atoms of the element in question in the hydrotalcite particles A, which is determined from primary component mapping of the hydrotalcite particles A in STEM-EDS mapping analysis of the toner. In addition, ※ indicates an appraisal as to whether or not fluorine atoms are contained in the inner part of the hydrotalcite particles, with "Yes" indicating that fluorine atoms are contained in the inner part of the hydrotalcite particles and "No" indicating that fluorine atoms are not contained in the inner part of the hydrotalcite particles.

In the table, "Areal ratio" indicates the areal ratio of the hydrotalcite particles A relative to the toner particles in an EDS measurement field of view, and "Fluorine/polyvalent metal" indicates the content of fluorine in the hydrotalcite particles A relative to the content of the polyvalent metal elements in the toner particle.

Image Evaluations

Image evaluations were carried out using a printer obtained by modifying parts of a commercially available color laser printer (a HP LaserJet Enterprise Color M555dn produced by HP). As a result of the modifications, the printer could be operated using only one color process cartridge. In addition, the printer was modified so that the temperature of the fixing unit could be altered to an arbitrary temperature. A toner was removed from a cyan cartridge and replaced by 180 g of a toner to be evaluated, which was then evaluated.

Fixing Performance (Cold Offsetting Resistance)

Three solid images (toner laid-on level: 0.9 mg/cm$^2$) were printed successively at different fixing temperatures on transfer materials, and the third image was evaluated using the criteria shown below. Fixed images were obtained at various temperatures by increasing the temperature at intervals of 10° C. from 170° C. to 190° C. in a normal temperature low humidity environment (temperature 23° C., relative humidity 5%). The obtained fixed images were evaluated in terms of cold offsetting resistance. Moreover, the fixing temperature is a value measured using a non-contact temperature gauge at the surface of a fixing roller before paper is fed to the roller. Letter sized plain paper (XEROX 4200 produced by XEROX, 75 g/m$^2$) was used as a transfer material.

The fixed images were evaluated visually in terms of cold offsetting according to the following criteria. An evaluation of C or better was assessed as being good.

Evaluation Criteria

A: No offsetting at 170° C.

B: Offsetting occurred at a temperature of 170° C.

C: Offsetting occurred at a temperature of 180° C.

D: Offsetting occurred at a temperature of 190° C.

Durability

In order to test the durability (charging stability) of the toner, fogging in a high temperature high humidity environment (temperature: 30° C., relative humidity: 80%) (HH fogging) was evaluated using the method described below.

In a high temperature high humidity environment, a total of 8000 images were outputted at a print percentage of 1.0% at a rate of 2000/day, with an intermission time of 2 seconds every two images, on Canon Color Laser Copier paper (A4; 81.4 g/m$^2$, hereinafter this paper is used unless explicitly indicated otherwise). After the initial image and the 8000th image, fogging on the drum in the cartridge was collected by taping and evaluated.

The fogging was measured using a reflection densitometer (REFLECTOMETER MODEL TC-6DS produced by TOKYO DENSHOKU). The fogging density (%) was taken to be the value of (Ds-Dr), where Ds denotes the worst value of reflected density of white background parts of the tape section and Dr denotes the average value of reflected density of white background parts of the taped part of the paper. The fogging density was taken to be the worst value when measurements were carried out using three types of filter, namely green, amber and blue. In this evaluation method, fogging on the drum increases in cases where toner durability deteriorates and charging performance decreases.

Fogging density evaluations were assessed using the following criteria. An evaluation of C or better was assessed as being good.

Evaluation Criteria

A: Fogging density of less than 0.5%

B: Fogging density of at least 0.5% and less than 1.5%

C: Fogging density of at least 1.5% and less than 3.0%

D: Fogging density of at least 3.0%

Storability 5 g of a toner was placed in a 50 mL resin cup and left to stand for 3 days in an environment at a temperature of 50° C. and a relative humidity of 10%, and the presence/absence of aggregated lumps was investigated visually after the toner was removed from the environment. Storability was assessed using the following criteria. An evaluation of C or better was assessed as being good.

Evaluation Criteria

A: No aggregated lumps were produced.

B: Minor aggregated lumps were produced, but these disintegrated when pressed lightly with a finger.

C: Aggregated lumps were produced, and these did not disintegrate when pressed lightly with a finger.

D: Complete aggregation

Examples 1 to 34

In Examples 1 to 34, toners 1 to 34 were used as toners and subjected to the evaluations described above. The evaluation results are shown in Table 6.

TABLE 6

| Example No. | Toner No. | Fixing performance Cold offsetting | Durability Fogging in HH environment Initial | | After 8000 prints | | Storability Blocking 3 days at 50° C. |
|---|---|---|---|---|---|---|---|
| 1 | 1 | A | 0.3 | A | 0.3 | A | A |
| 2 | 2 | A | 0.3 | A | 0.3 | A | A |
| 3 | 3 | A | 0.3 | A | 0.4 | A | A |
| 4 | 4 | A | 0.4 | A | 0.3 | A | A |
| 5 | 5 | A | 0.3 | A | 0.4 | A | A |
| 6 | 6 | A | 0.4 | A | 0.4 | A | A |
| 7 | 7 | A | 0.3 | A | 0.3 | A | A |
| 8 | 8 | C | 0.3 | A | 0.4 | A | A |
| 9 | 9 | A | 0.3 | A | 0.3 | A | A |
| 10 | 10 | A | 0.4 | A | 0.4 | A | A |
| 11 | 11 | A | 0.3 | A | 0.3 | A | A |
| 12 | 12 | A | 0.4 | A | 0.9 | B | A |
| 13 | 13 | A | 0.3 | A | 1.2 | B | A |
| 14 | 14 | A | 0.3 | A | 1.4 | B | A |
| 15 | 15 | A | 0.4 | A | 1.3 | B | A |
| 16 | 16 | A | 0.4 | A | 0.3 | A | A |
| 17 | 17 | A | 0.3 | A | 0.4 | A | A |
| 18 | 18 | A | 0.4 | A | 0.3 | A | A |
| 19 | 19 | A | 0.3 | A | 0.8 | B | A |
| 20 | 20 | A | 0.3 | A | 0.9 | B | A |
| 21 | 21 | B | 0.3 | A | 1.3 | B | A |
| 22 | 22 | B | 0.4 | A | 1.4 | B | A |
| 23 | 23 | A | 0.3 | A | 0.3 | A | A |
| 24 | 24 | A | 0.3 | A | 0.4 | A | A |
| 25 | 25 | A | 0.3 | A | 0.3 | A | A |
| 26 | 26 | B | 0.3 | A | 0.3 | A | B |
| 27 | 27 | A | 0.3 | A | 0.3 | A | A |
| 28 | 28 | A | 0.4 | A | 0.4 | A | A |
| 29 | 29 | A | 0.3 | A | 0.3 | A | A |
| 30 | 30 | A | 0.4 | A | 0.3 | A | B |
| 31 | 31 | A | 0.3 | A | 0.4 | A | A |
| 32 | 32 | A | 0.4 | A | 0.3 | A | A |
| 33 | 33 | A | 0.3 | A | 0.4 | A | A |
| 34 | 34 | A | 0.3 | A | 0.4 | A | A |

Comparative Examples 1 to 6

In Comparative Examples 1 to 6, toners 35 to 40 were used as toners and subjected to the evaluations described above. The evaluation results are shown in Table 7.

TABLE 7

| Comparative Example No. | Toner No. | Fixing performance Cold offsetting | Durability Fogging in HH environment Initial | | After 8000 prints | | Storability Blocking 3 days at 50° C. |
|---|---|---|---|---|---|---|---|
| 1 | 35 | D | 0.3 | A | 0.4 | A | A |
| 2 | 36 | D | 0.8 | B | 3.2 | D | A |
| 3 | 37 | D | 1.1 | B | 3.5 | D | A |
| 4 | 38 | D | 0.4 | A | 2.5 | C | A |
| 5 | 39 | D | 0.4 | A | 0.4 | A | D |
| 6 | 40 | D | 0.4 | A | 0.8 | B | A |

Good results were obtained for all evaluation items with Working Examples 1 to 34. However, Comparative Examples 1 to 6 produced inferior results to examples for some of the evaluation items.

According to the present disclosure, it is possible to obtain a toner which exhibits excellent low-temperature fixability and good durability in view of the results above.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-029176, filed Feb. 28, 2022, which is hereby incorporated by reference herein in its entirety.

What is claimed is:

1. A toner, comprising:

a toner particle and an external additive;

the toner particle comprising a core comprising a resin A, and having a shell comprising a resin B on the surface of the core;

the external additive comprising a hydrotalcite particle A; and fluorine and aluminum being present in an inner part of the hydrotalcite particle A in line analysis in STEM-EDS mapping analysis of the toner, wherein a concentration ratio of the number of fluorine atoms relative to aluminum atoms (F/Al) in the hydrotalcite particle A is 0.04 to 0.30, as determined by primary component mapping of the hydrotalcite particle A in the STEM-EDS mapping analysis of the toner.

2. The toner according to claim 1, wherein the toner particle comprises at least one polyvalent metal element selected from the group consisting of aluminum, magnesium, calcium and iron, and a value of a ratio of a content of fluorine in the hydrotalcite particle A relative to a content of the polyvalent metal element in the toner particle is 2.0 to 100.0 in primary component mapping of the toner particle and primary component mapping of the hydrotalcite particle A in the STEM-EDS mapping analysis of the toner.

3. The toner according to claim 1, wherein the toner particle contains a wax, and a ratio by number of toner particles in which domains of the wax having areas of at least $1.0\times10^{-14}$ $m^2$ are present even partially in a region 0.1 μm from the surface of the toner particle is not more than 15% in a cross section of the toner observed using a transmission electron microscope.

4. The toner according to claim 1, wherein hydrotalcite particle A comprises magnesium.

5. The toner according to claim 4, wherein a value of a concentration ratio of the number of magnesium atoms relative to aluminum atoms (Mg/Al) in the hydrotalcite particle A is 1.5 to 4.0, as determined by primary component mapping of the hydrotalcite particle A in the STEM-EDS mapping analysis of the toner.

6. The toner according to claim 1, wherein primary particles of hydrotalcite particle A have a number average particle diameter of 60 to 1000 nm.

7. The toner according to claim 1, wherein the toner particle comprises aluminum as a polyvalent metal element, and a content of aluminum in the toner particle is 0.01 to 0.07 in primary component mapping of the toner particle in the STEM-EDS mapping analysis of the toner, when a concentration of the number of carbon atoms in the toner particle is taken to be 100.

8. The toner according to claim 1, wherein an areal ratio of the hydrotalcite particle A relative to toner particle in an EDS measurement field of view is 0.07 to 0.54%, as measured by the STEM-EDS mapping analysis of the toner.

9. The toner according to claim 1, wherein the toner particle comprises a wax, and the wax comprises a hydrocarbon wax and an ester wax.

10. The toner according to claim 1, wherein resin A comprises a styrene acrylic resin, and resin B comprises a styrene acrylic resin.

11. The toner according to claim 1, wherein resin A comprises a polyester resin, and resin B comprises a polyester resin.

12. The toner according to claim 1, wherein resin A comprises a styrene acrylic resin, and resin B comprises a polyester resin.

13. The toner according to claim 1, wherein resin B has a glass transition temperature Tg of 55 to 80° C.

14. The toner according to claim 1, wherein the toner particle comprises a wax, and aluminum as a polyvalent metal element, a ratio by number of toner particles in which domains of the wax having areas of at least $1.0\times10^{-14}$ $m^2$ are present even partially in a region 0.1 μm from the surface of the toner particle is not more than 10% in a cross section of the toner observed using a transmission electron microscope, a content of aluminum in the toner particle is 0.02 to 0.06 in primary component mapping of the toner particle in the STEM-EDS mapping analysis of the toner, when a concentration of the number of carbon atoms in the toner particle is taken to be 100, a number average particle diameter of primary particle of the hydrotalcite particle A is 60 to 800 nm, and a glass transition temperature Tg of resin A is higher than a glass transition temperature Tg of resin B.

* * * * *